United States Patent
Fujimori et al.

(10) Patent No.: US 12,490,001 B2
(45) Date of Patent: Dec. 2, 2025

(54) SOLID-STATE IMAGING DEVICE AND IMAGING APPARATUS

(71) Applicant: Nuvoton Technology Corporation Japan, Kyoto (JP)

(72) Inventors: Yoshihisa Fujimori, Kyoto (JP); Yasuhiro Kosaka, Shiga (JP); Takeshi Sowa, Kyoto (JP); Kazuaki Sogawa, Osaka (JP)

(73) Assignee: NUVOTON TECHNOLOGY CORPORATION JAPAN, Kyoto (JP)

( * ) Notice: Subject to any disclaimer, the term of this patent is extended or adjusted under 35 U.S.C. 154(b) by 107 days.

(21) Appl. No.: 18/535,467

(22) Filed: Dec. 11, 2023

(65) Prior Publication Data

US 2024/0107200 A1 Mar. 28, 2024

Related U.S. Application Data

(63) Continuation of application No. PCT/JP2022/021693, filed on May 27, 2022.

(30) Foreign Application Priority Data

Jun. 16, 2021 (JP) .................................. 2021-100070

(51) Int. Cl.
*H04N 25/778* (2023.01)
*H04N 25/78* (2023.01)
(Continued)

(52) U.S. Cl.
CPC ........... *H04N 25/778* (2023.01); *H04N 25/79* (2023.01); *H10F 39/182* (2025.01); *H04N 25/78* (2023.01)

(58) Field of Classification Search
CPC ...... H04N 25/778; H04N 25/79; H04N 25/78; H04N 25/61; H04N 25/673; H10F 39/182; H10F 39/12; H10F 39/802; H10F 39/813

See application file for complete search history.

(56) References Cited

U.S. PATENT DOCUMENTS 6,791,619 B1 9/2004 Misawa
2004/0239770 A1* 12/2004 Misawa .............. H10F 39/1515
348/E3.018

(Continued)

FOREIGN PATENT DOCUMENTS

JP 2000-077637 A 3/2000
JP 2007-028326 A 2/2007
(Continued)

OTHER PUBLICATIONS

International Search Report dated Jul. 26, 2022 issued in International Patent Application No. PCT/JP2022/021693, with English translation.

*Primary Examiner* — Kelly L Jerabek
(74) *Attorney, Agent, or Firm* — Rimon P.C.

(57) ABSTRACT

A solid-state imaging device includes a pixel array that is quadrilateral and includes pixels arranged in rows and columns, where each of the pixels accumulates an electric charge resulting from photoelectric conversion. The pixel array includes: a first area including first pixels for obtaining a captured image; and a second area including a second pixel for individually identifying the solid-state imaging device. The second area is provided in the vicinity of at least one corner among four corners of the pixel array, where the vicinity is a range of a predetermined number of pixels away from the at least one corner. The second pixel includes (Continued)

circuit elements or optical elements different from circuit elements or optical elements in each of the first pixels.

19 Claims, 27 Drawing Sheets

(51) Int. Cl.
*H04N 25/79* (2023.01)
*H10F 39/18* (2025.01)

(56) References Cited

U.S. PATENT DOCUMENTS

| | | |
|---|---|---|
| 2004/0239789 A1 | 12/2004 | Bruce et al. |
| 2007/0019088 A1 | 1/2007 | Saito |
| 2015/0229860 A1 | 8/2015 | Wany |
| 2018/0098060 A1 | 4/2018 | Igarashi et al. |
| 2019/0296066 A1* | 9/2019 | Ahn .................. H10F 39/8057 |
| 2024/0006438 A1* | 1/2024 | Oshiyama ........... H10F 39/8057 |

FOREIGN PATENT DOCUMENTS

| | | |
|---|---|---|
| JP | 2018-061234 A | 4/2018 |
| JP | 2020-043430 A | 3/2020 |

\* cited by examiner

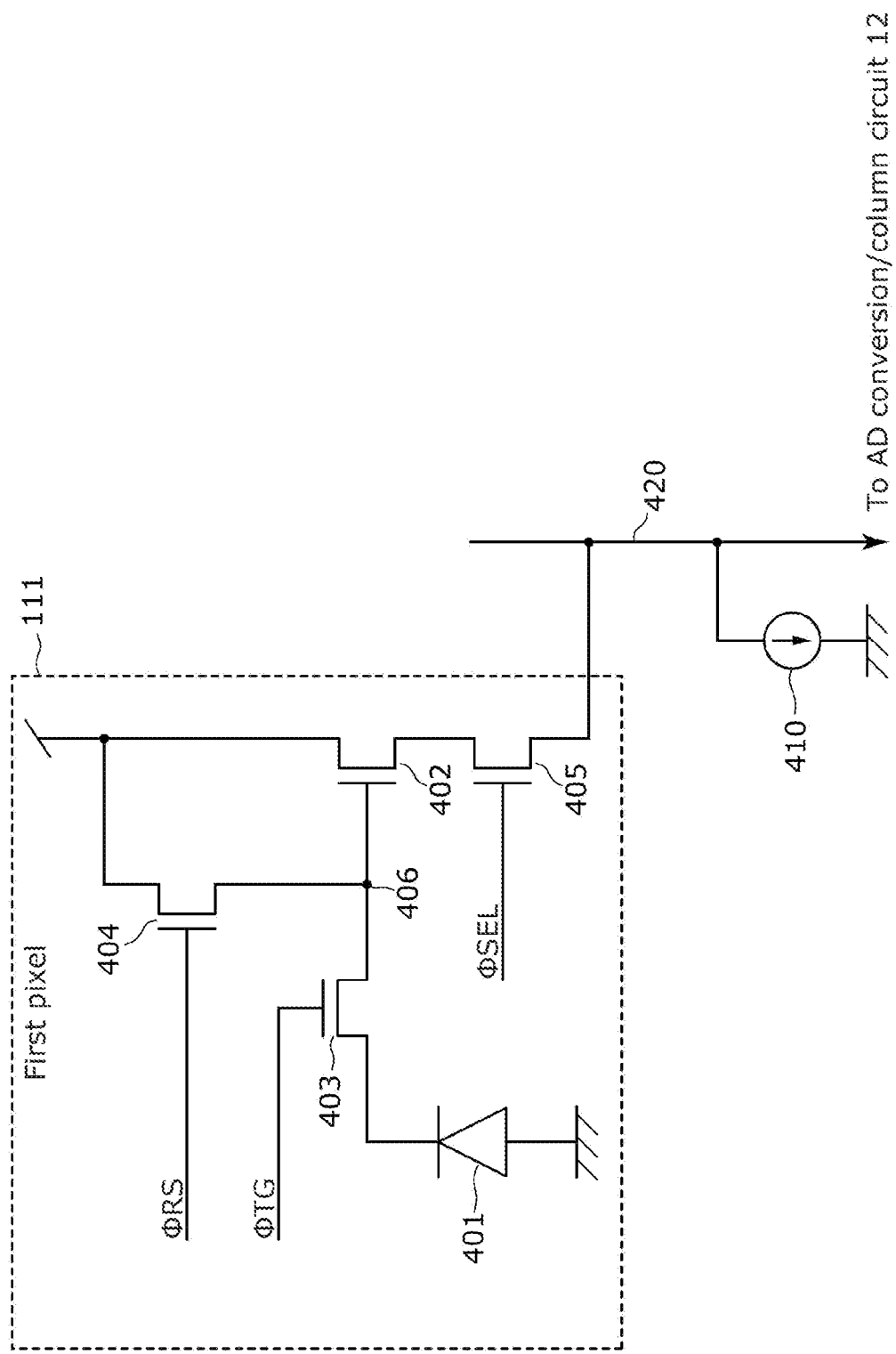

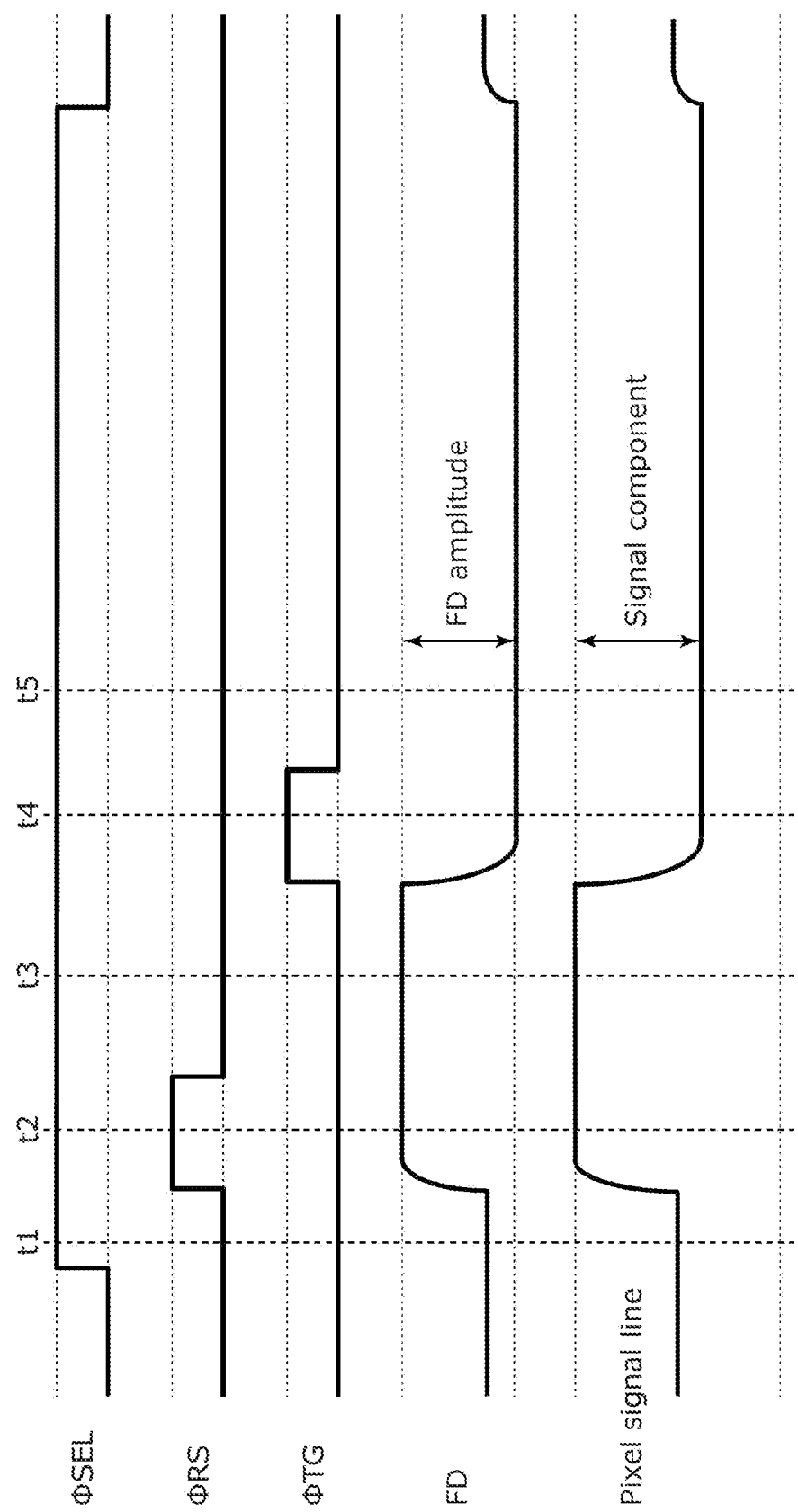

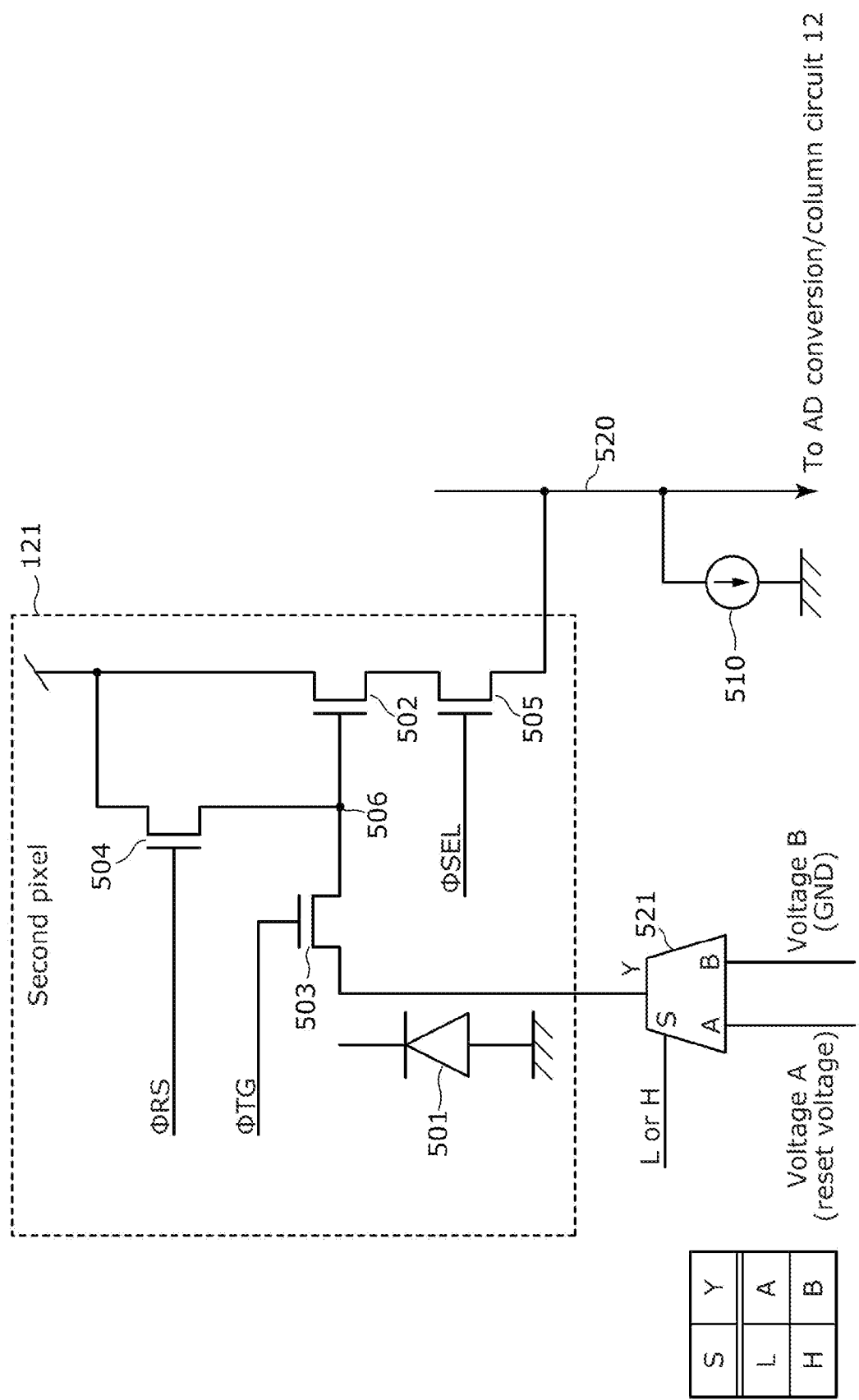

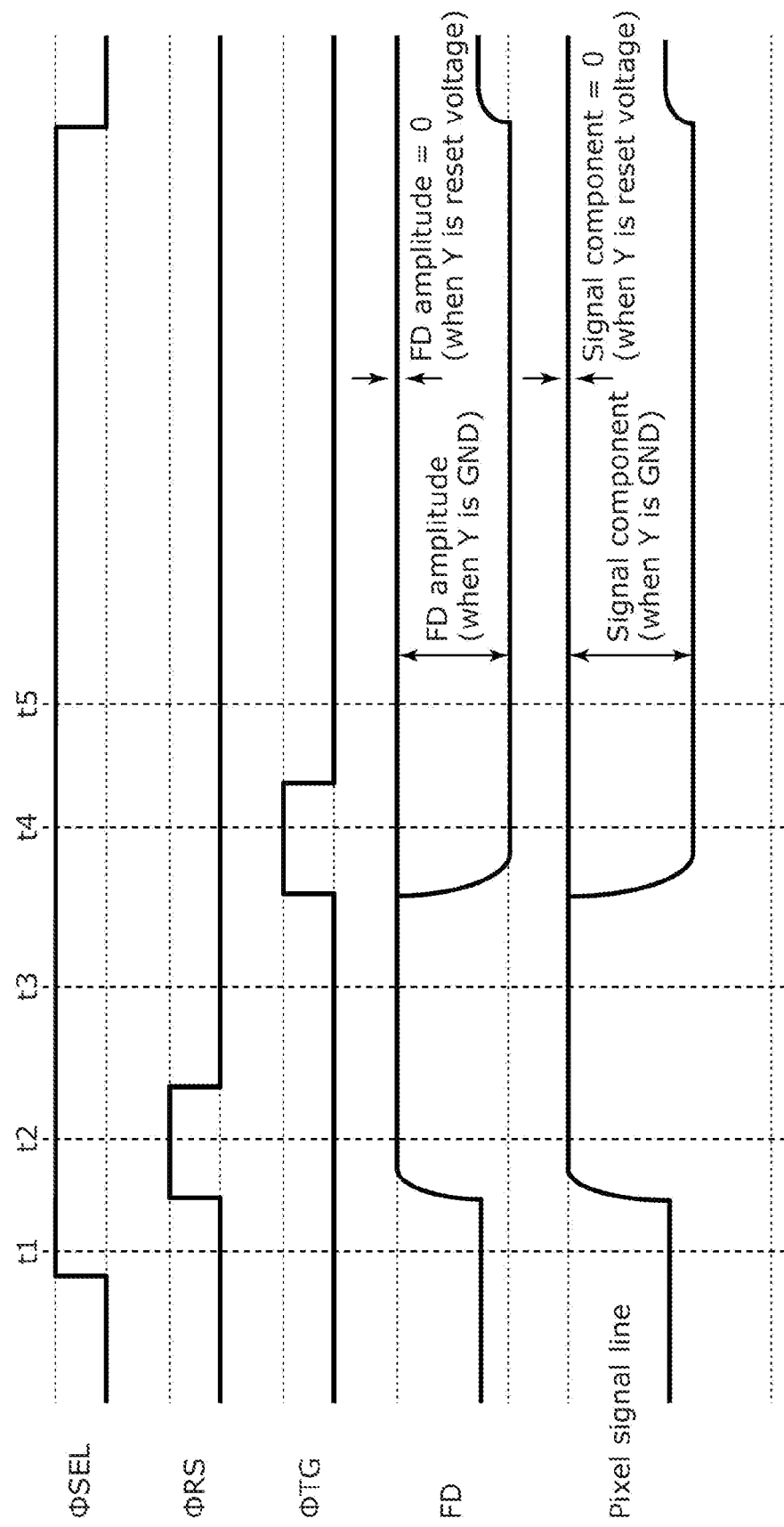

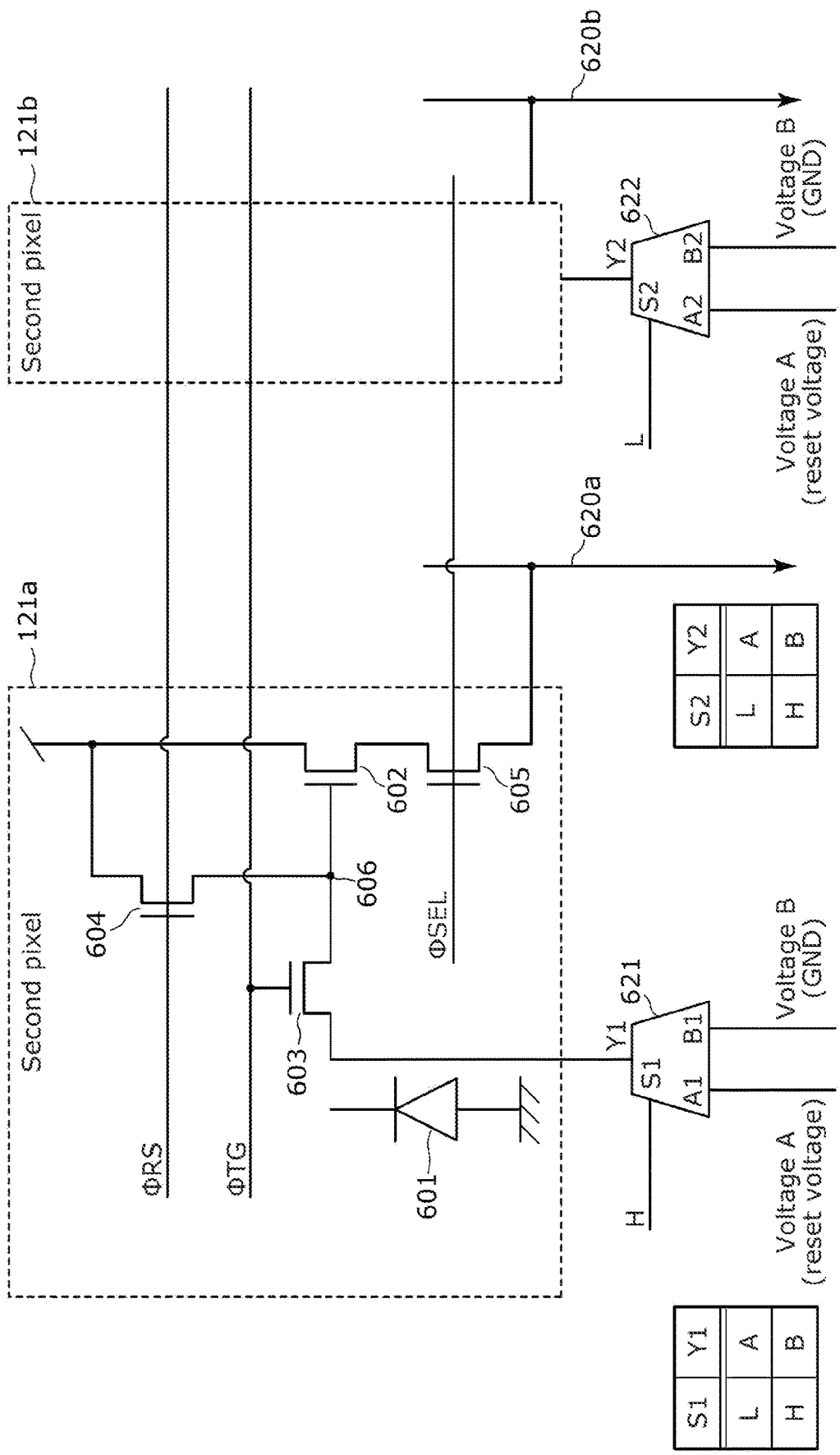

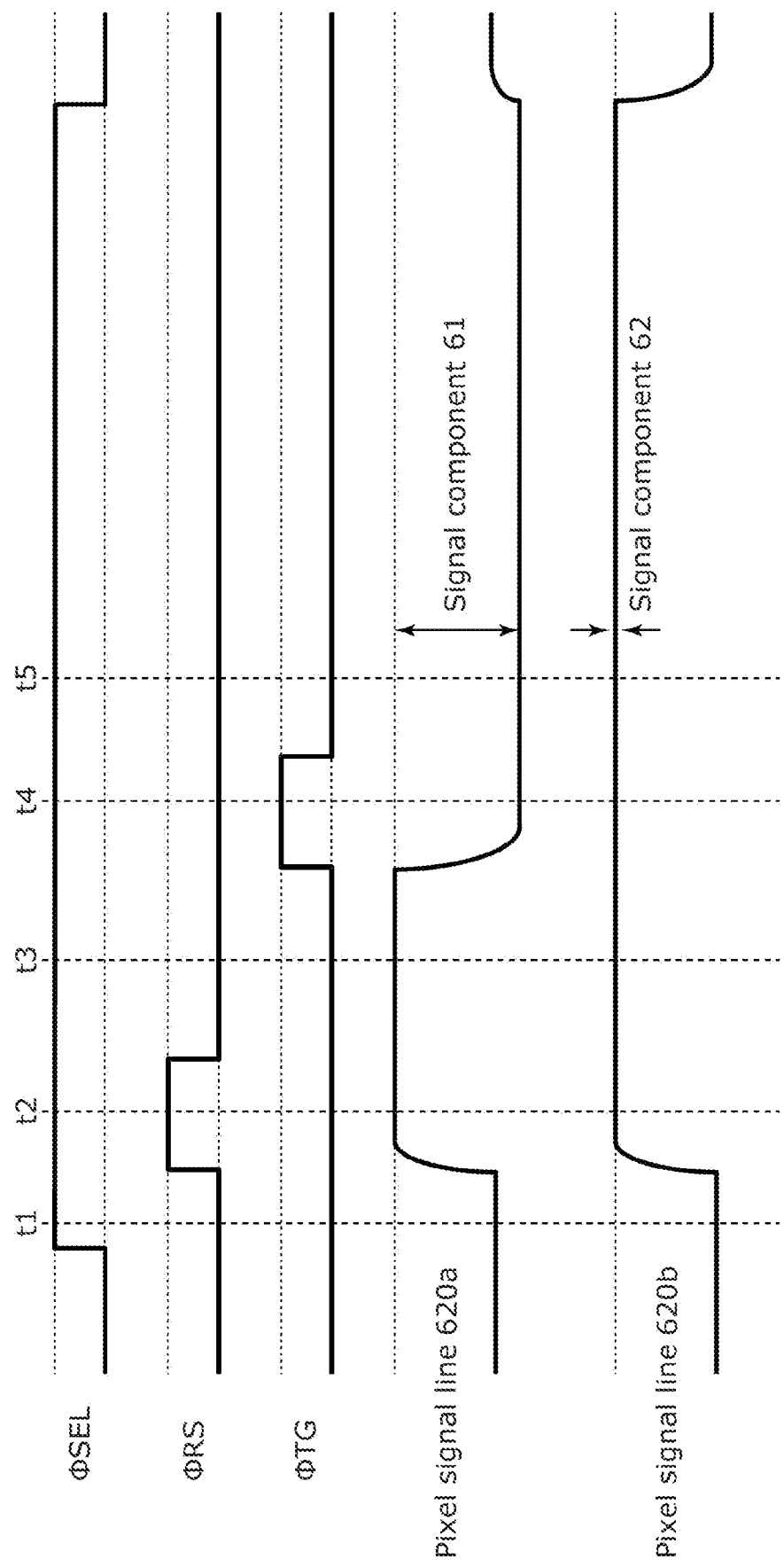

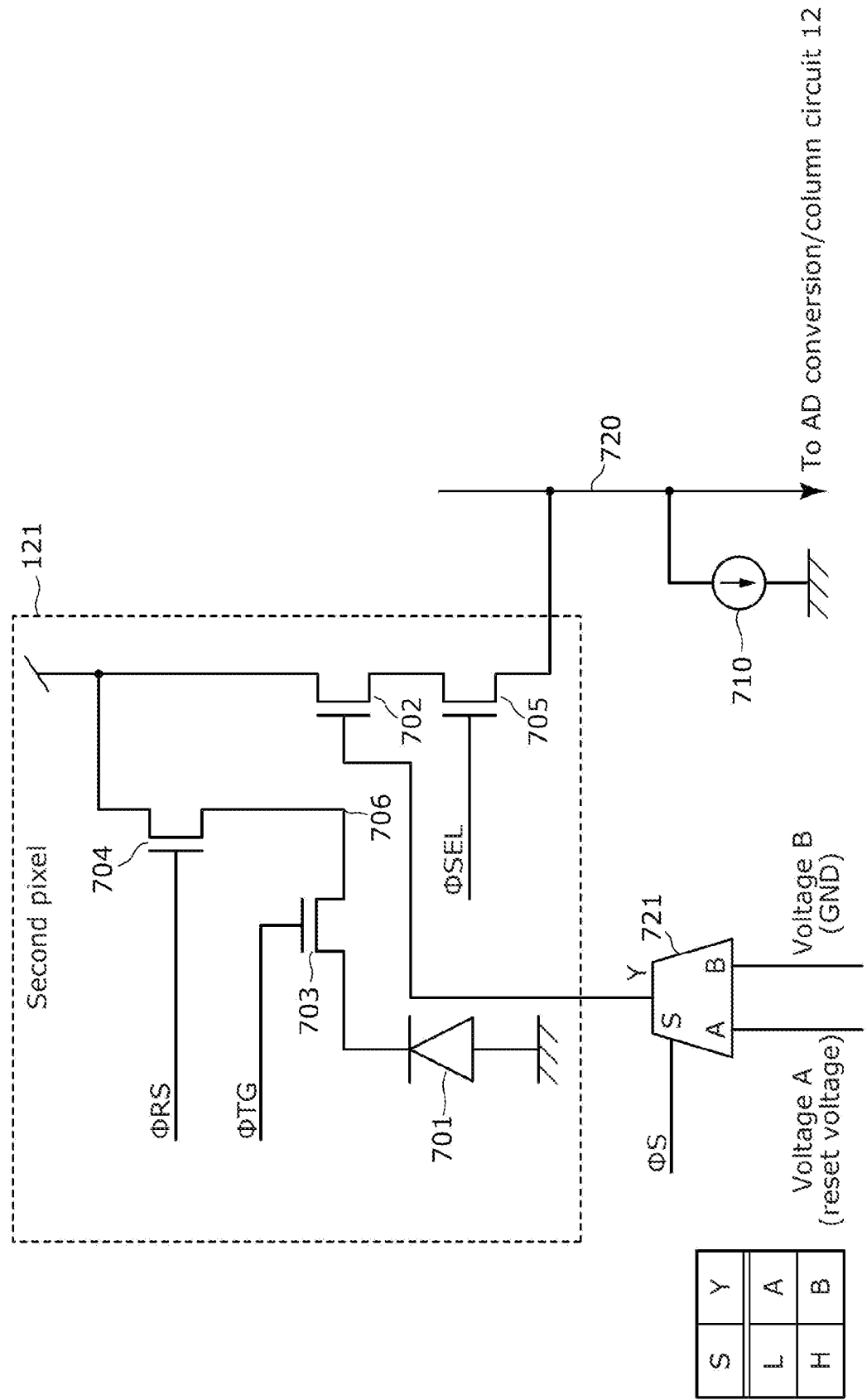

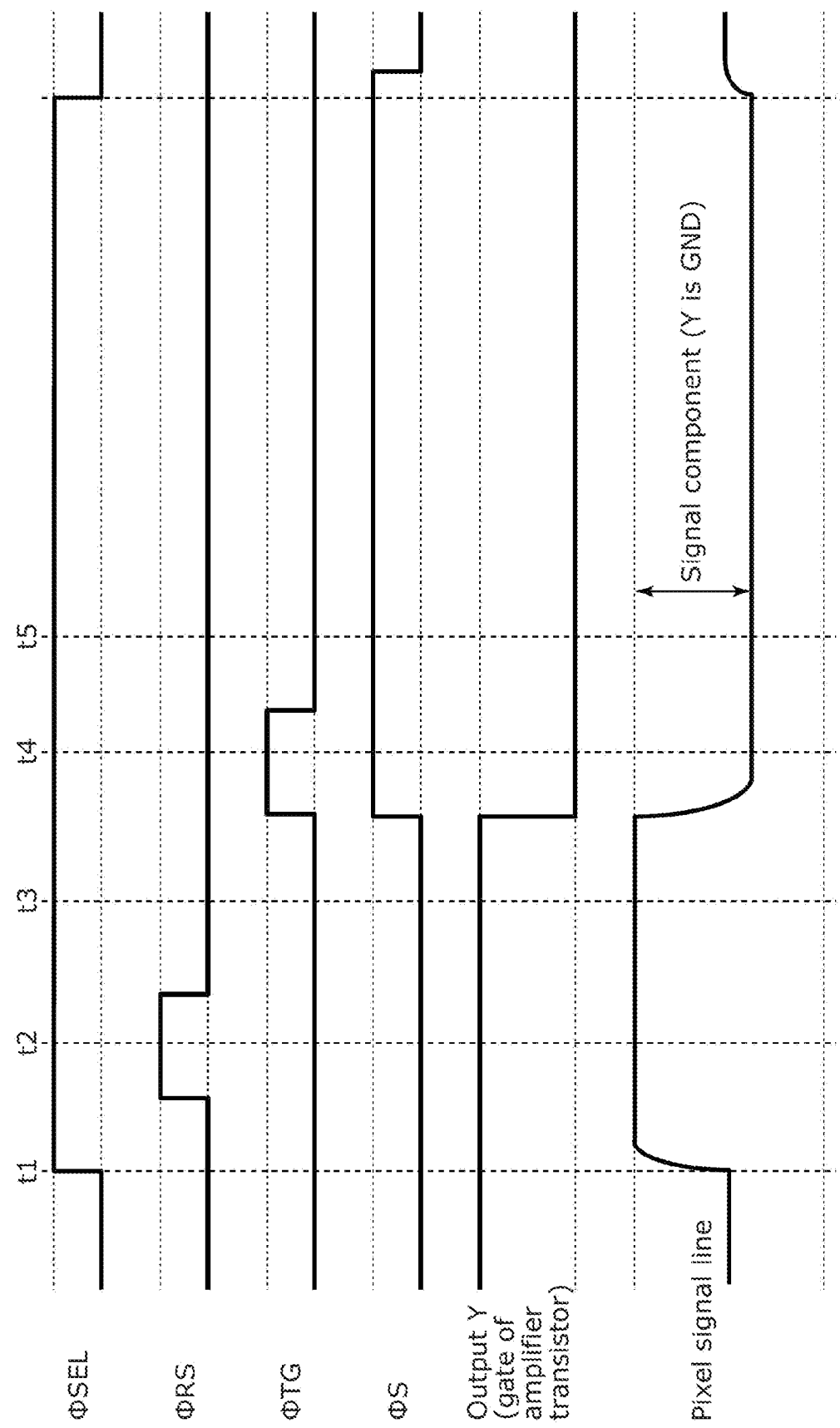

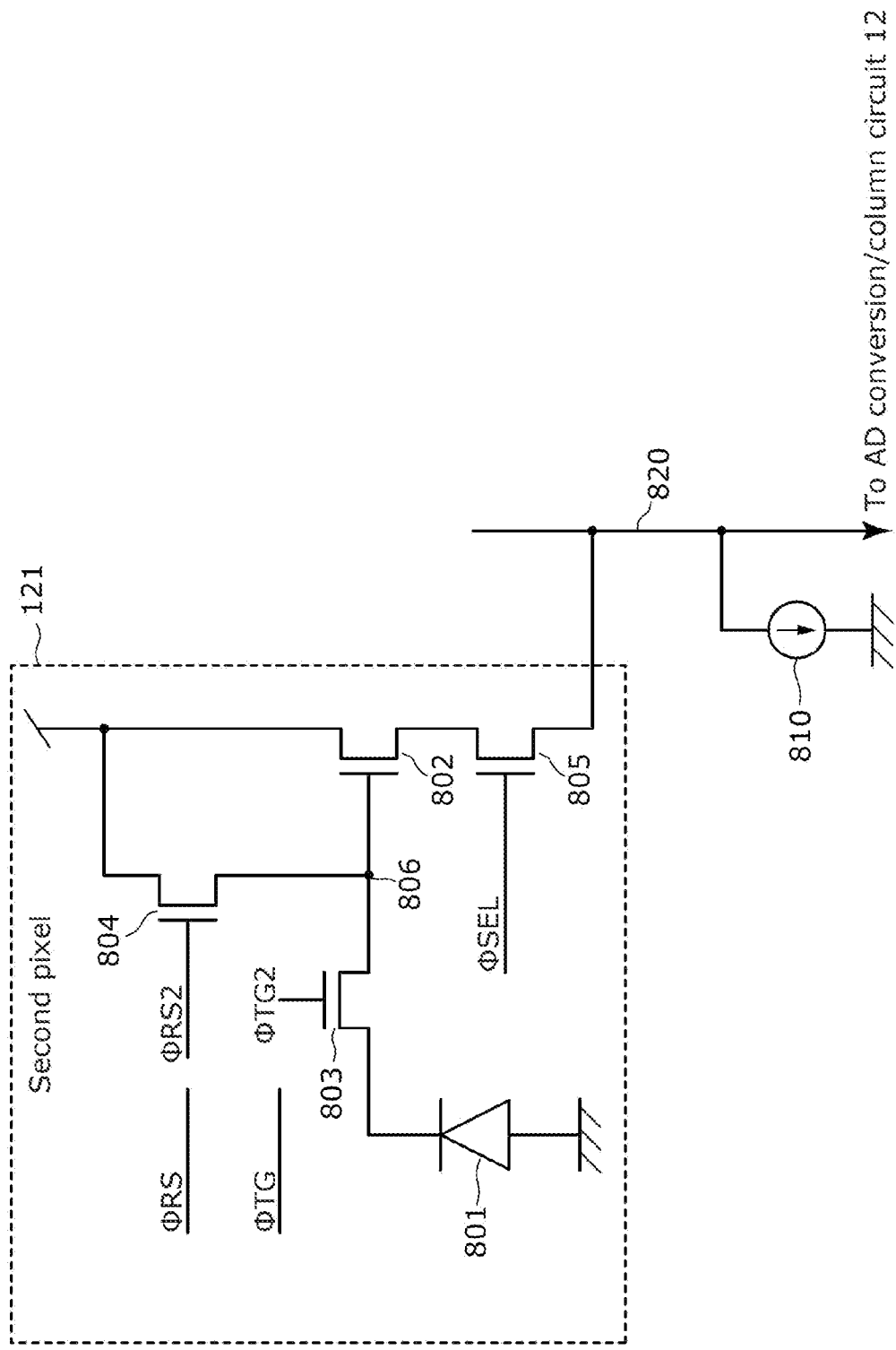

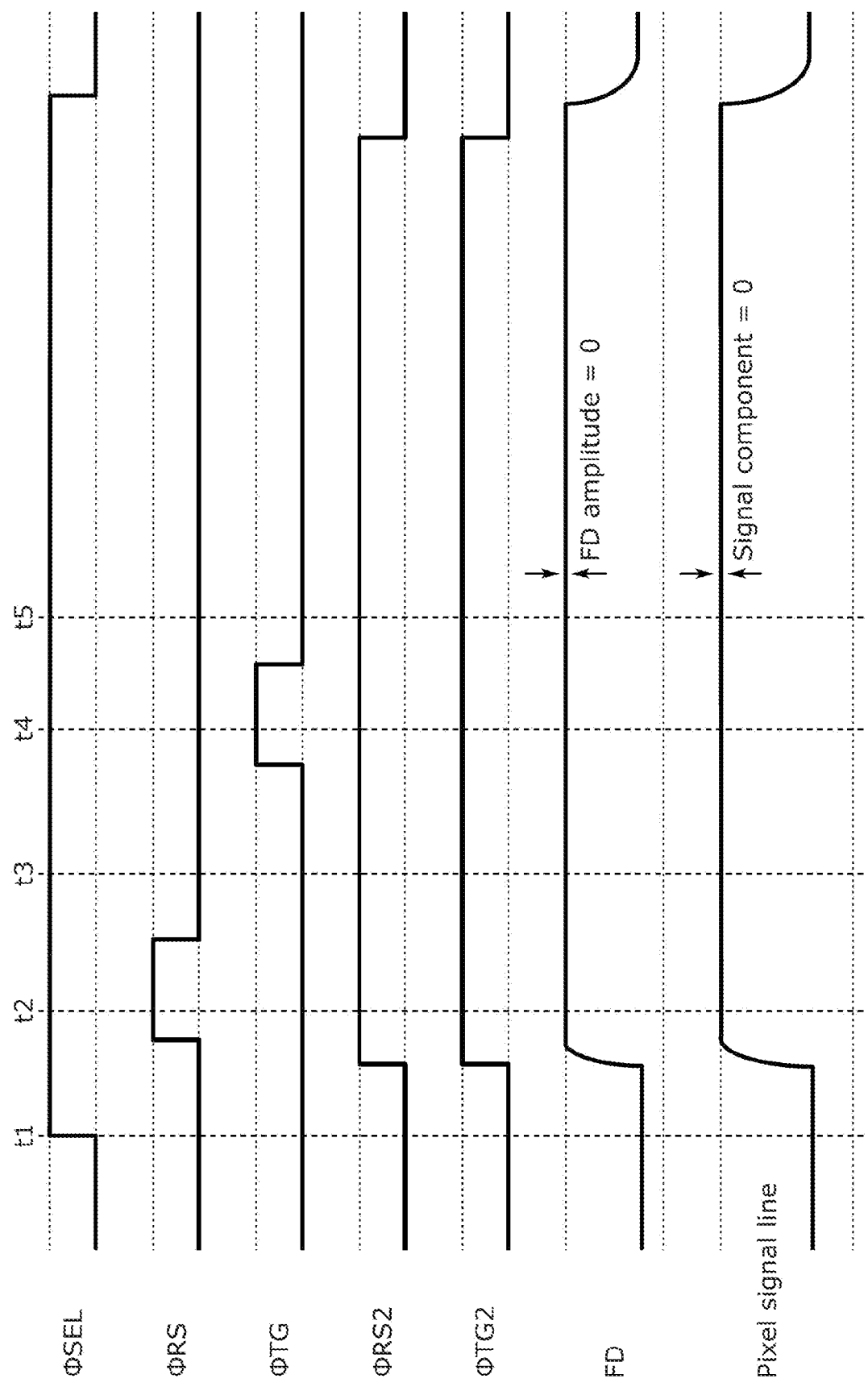

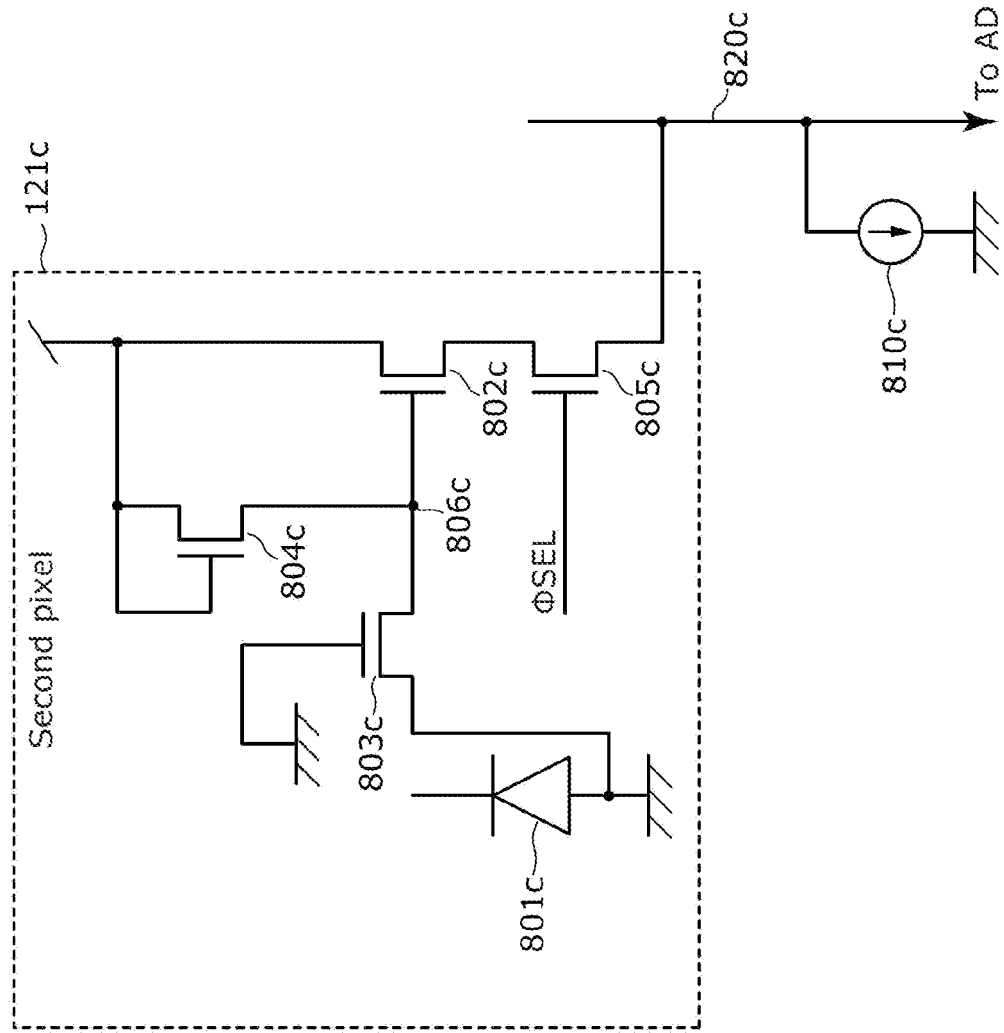

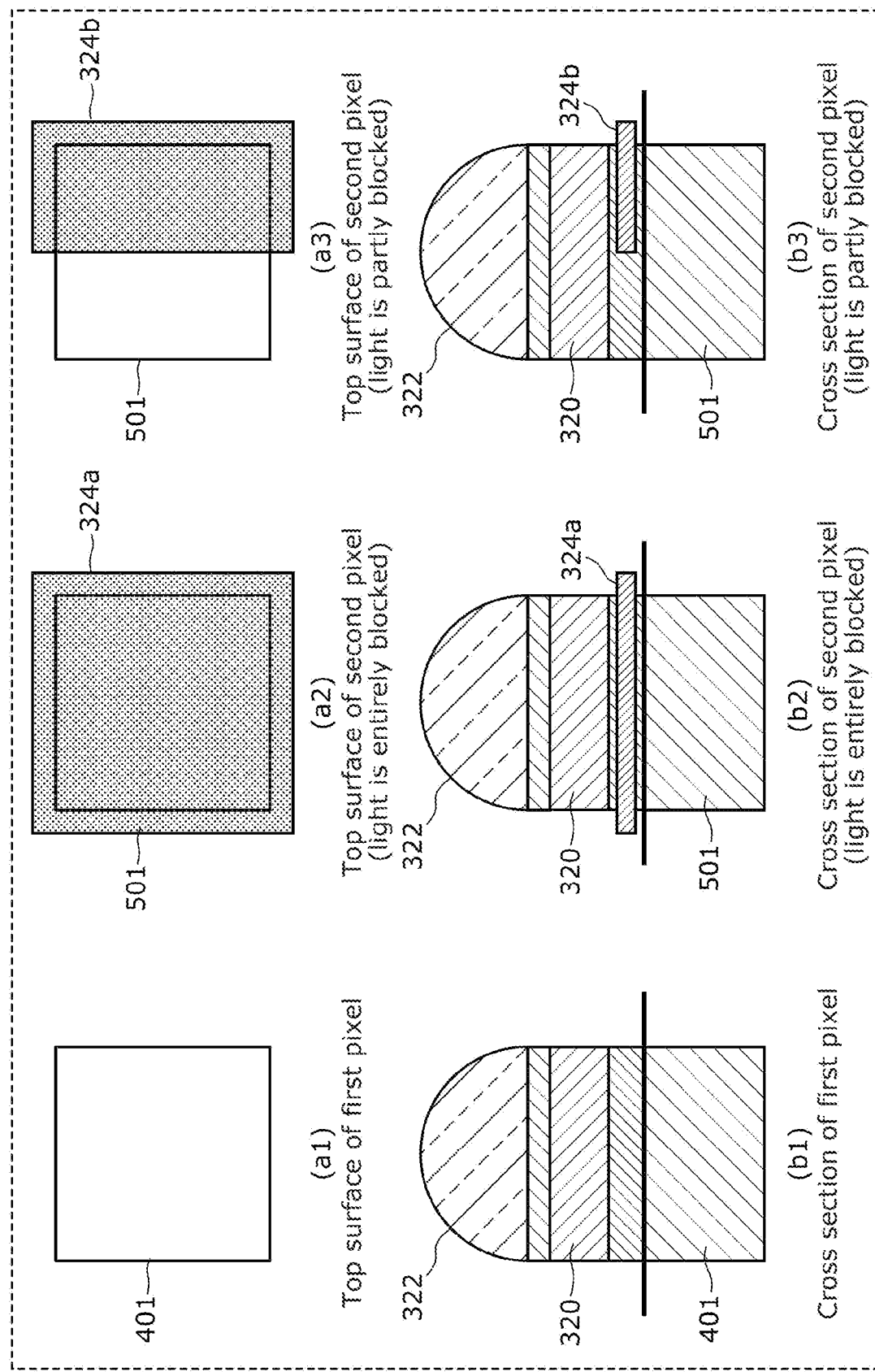

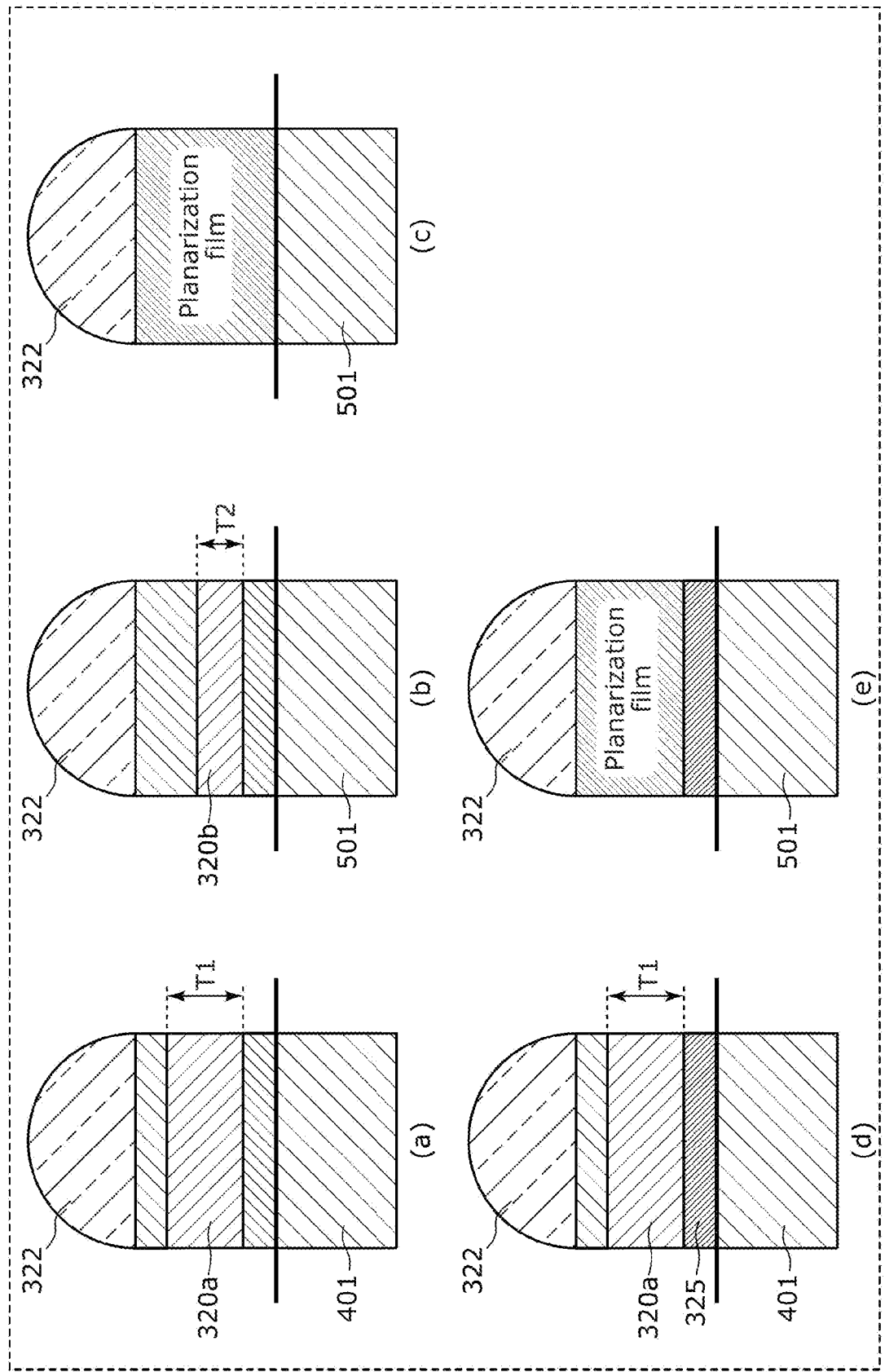

FIG. 15

| 1-1 | 2-2 | 3-1 | 1-2 | 2-1 | 3-2 |
|-----|-----|-----|-----|-----|-----|
| 4-3 | 5-4 | 6-3 | 4-4 | 5-3 | 6-4 |
| 7-5 | 8-6 | 9-5 | 7-5 | 8-5 | 9-6 |
| 10-1 | 11-2 | 12-1 | 10-2 | 11-1 | 12-2 |
| 1-3 | 2-4 | 3-3 | 1-4 | 2-3 | 3-4 |
| 4-5 | 5-6 | 6-5 | 4-6 | 5-5 | 6-6 |
| 7-1 | 8-2 | 9-1 | 7-2 | 8-1 | 9-2 |
| 10-3 | 11-4 | 12-3 | 10-4 | 11-3 | 12-4 |
| 1-5 | 2-6 | 3-5 | 1-6 | 2-5 | 3-6 |
| 4-1 | 5-2 | 6-1 | 4-2 | 5-1 | 6-2 |
| 7-3 | 8-4 | 9-3 | 7-4 | 8-3 | 9-4 |
| 10-5 | 11-6 | 12-5 | 10-6 | 11-5 | 12-6 |

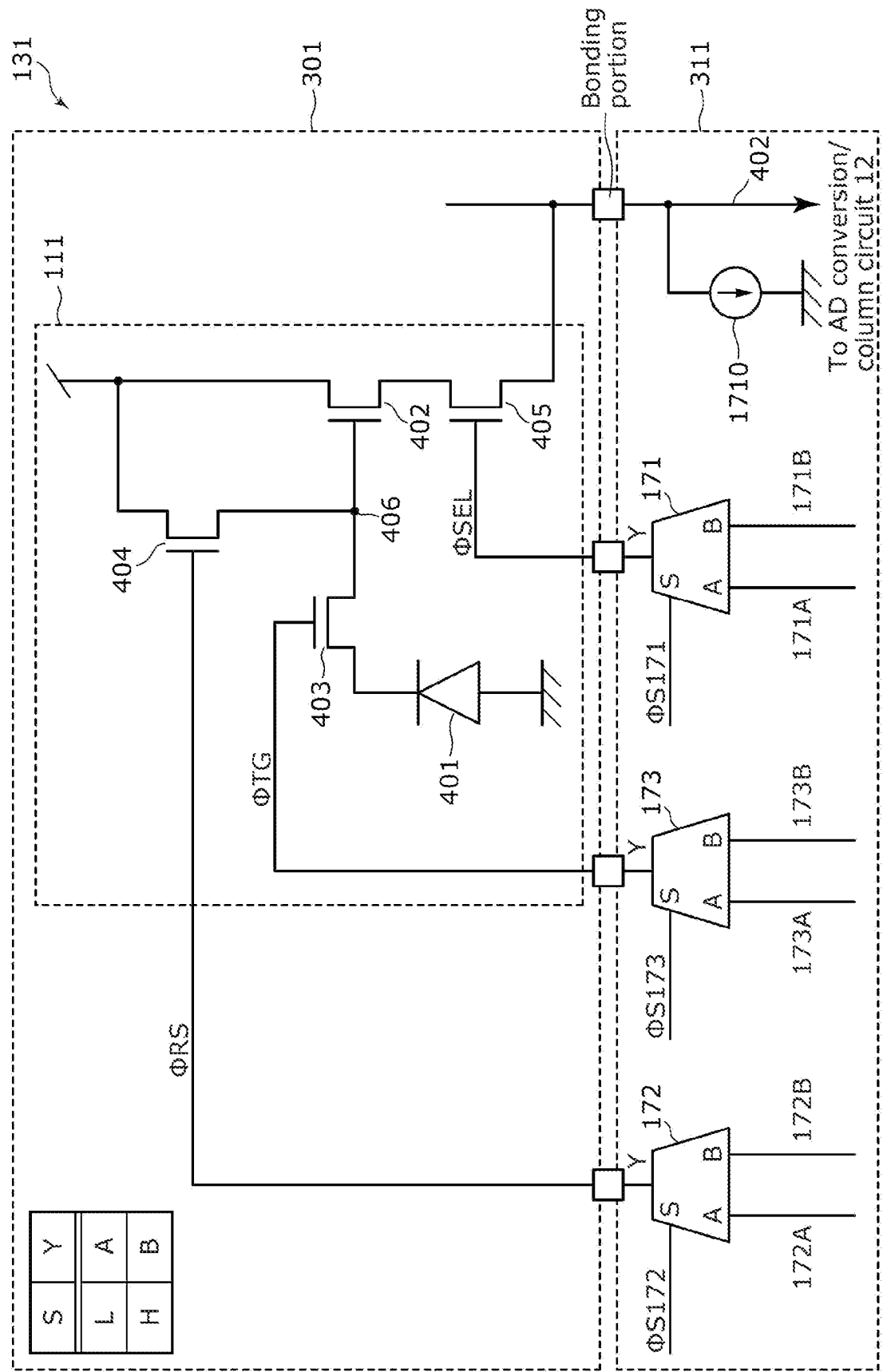

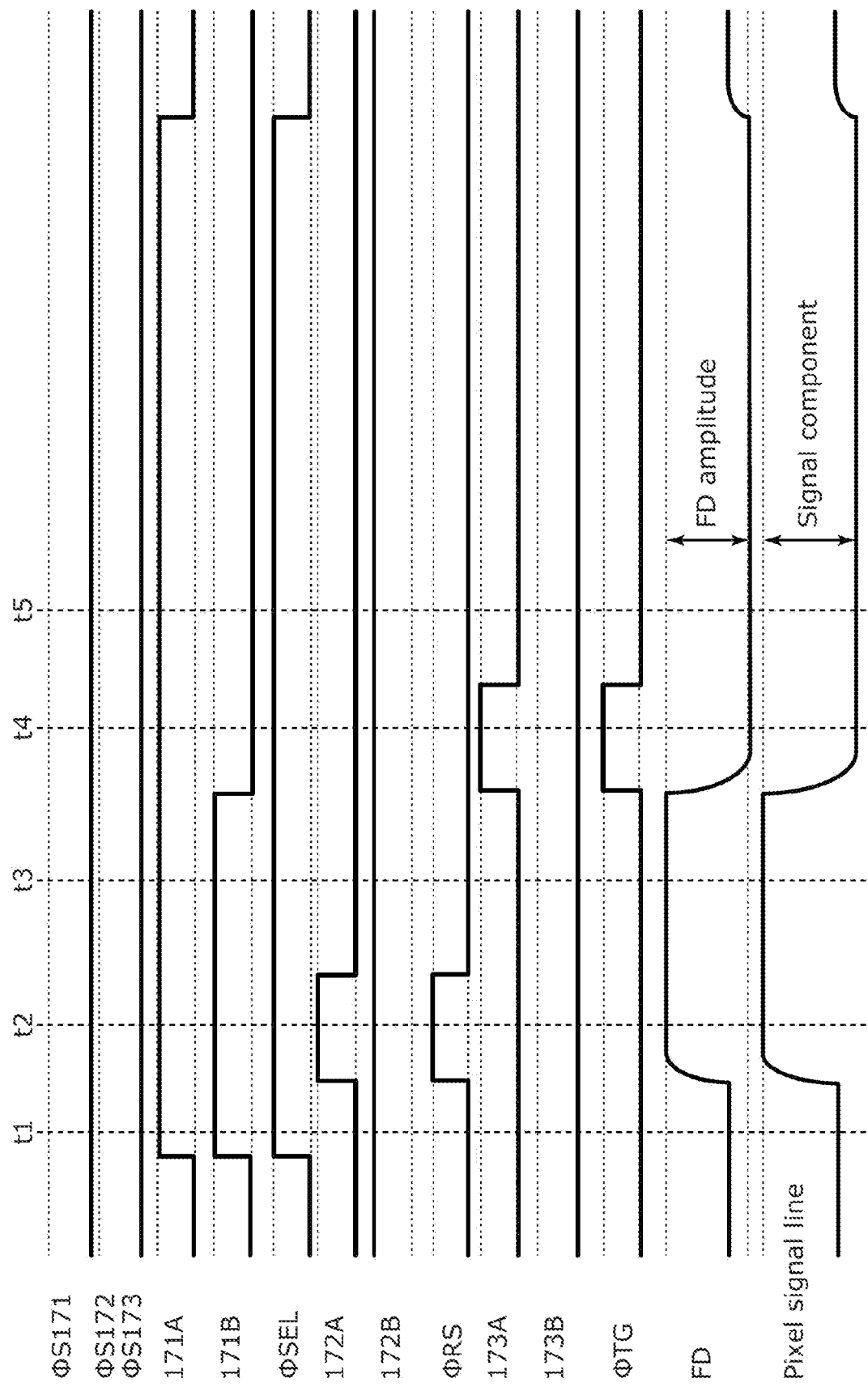

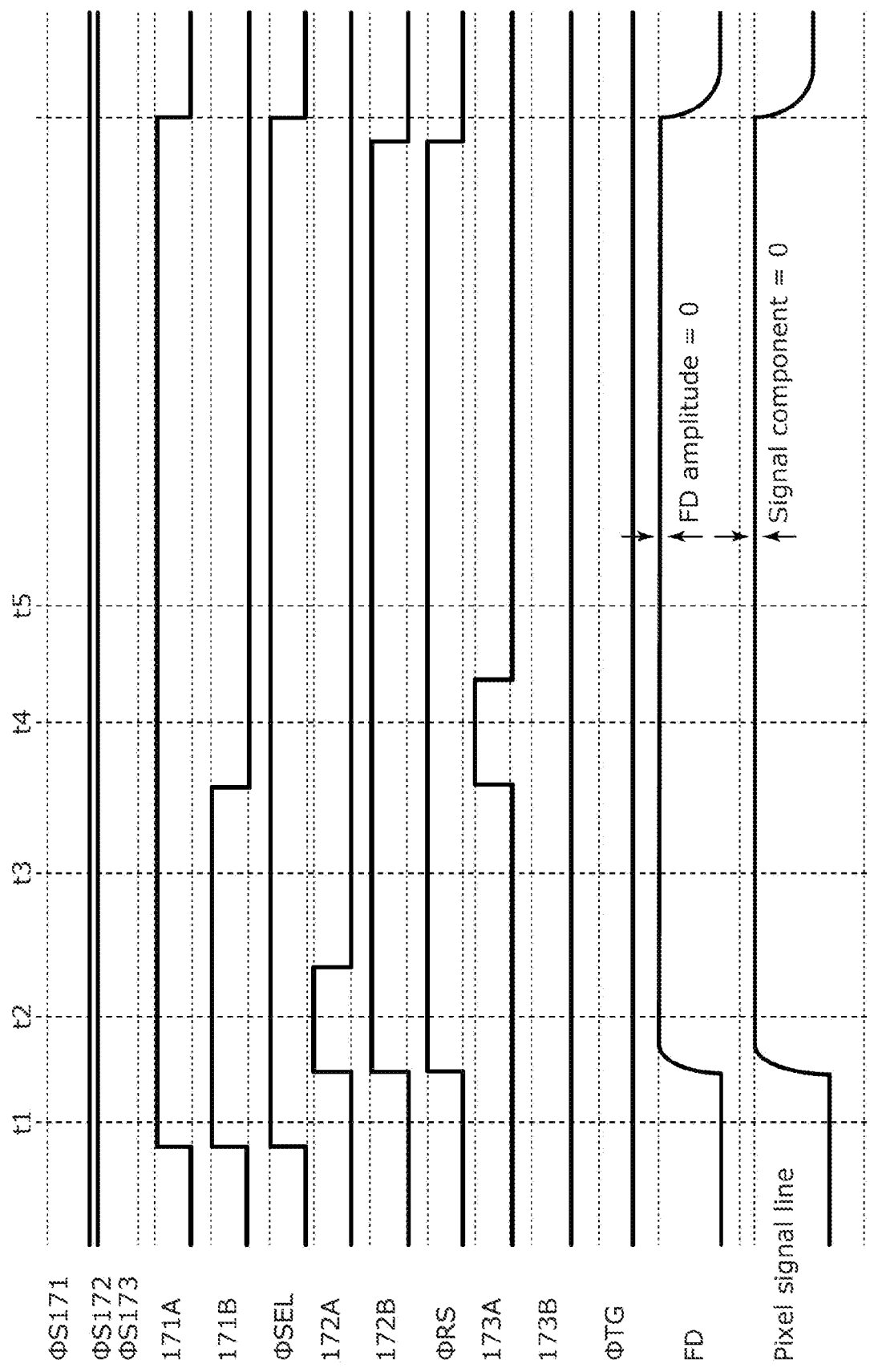

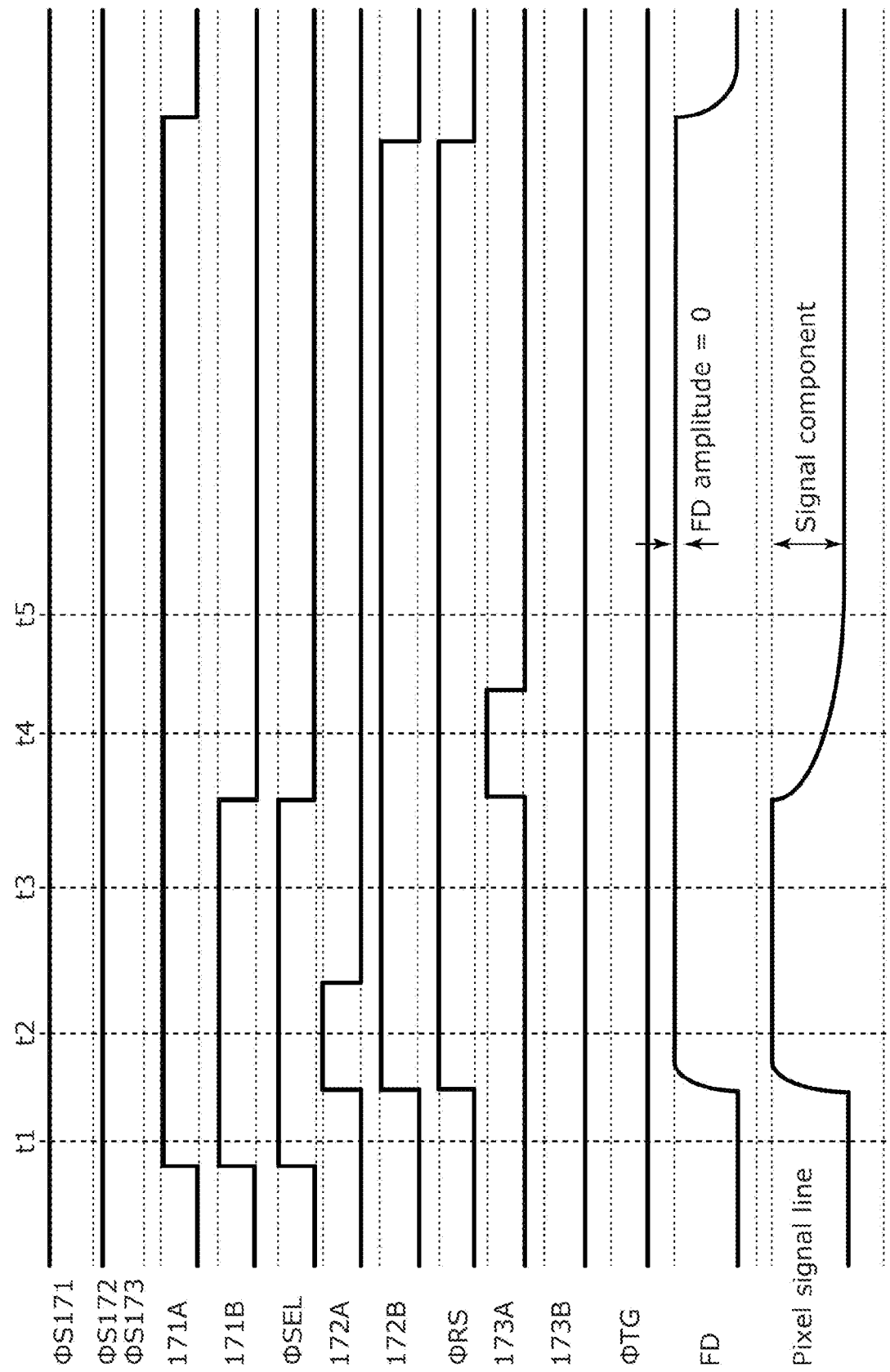

SOLID-STATE IMAGING DEVICE AND IMAGING APPARATUS

CROSS REFERENCE TO RELATED APPLICATIONS

This is a continuation application of PCT International Application No. PCT/JP2022/021693 filed on May 27, 2022, designating the United States of America, which is based on and claims priority of Japanese Patent Application No. 2021-100070 filed on Jun. 16, 2021. The entire disclosures of the above-identified applications, including the specifications, drawings and claims are incorporated herein by reference in their entirety.

FIELD

The present disclosure relates to solid-state imaging devices and imaging apparatuses, and particularly relates to solid-state imaging devices that enable individual identification while reducing area increase.

BACKGROUND

There are cases that require an analysis of a semiconductor product due to, for instance, a breakdown of the semiconductor product after shipment. To check property variations in the semiconductor product at the stage of shipment in such cases, measures are taken to allow a semiconductor chip (hereinafter also simply referred to as "chip") to have individual identification information so that the identity of the semiconductor used in the semiconductor product can be traced (see PTL 1).

PTL 1 discloses a method of enabling, without having to prepare memory, individual identification of a solid-state imaging device that has defective pixels by outputting the location information of each of the defective pixels. The defective pixels are any damaged light-receiving pixels in both an image area on which light is incident and a non-image area on which light is not incident.

CITATION LIST

Patent Literature

PTL 1: Japanese Unexamined Patent Application Publication No. 2007-28326

SUMMARY

Technical Problem

However, with a solid-state imaging device, the light cast through the lens is typically projected in a circular shape, and a chip needs to be designed so that an image area is placed in this circular area (hereinafter referred to as "image circle"). According to the configuration of the solid-state imaging device disclosed in PTL 1, the non-image area is placed at the outer periphery of the image area, but in applications that require a reduction in chip area, such as applications to endoscopes, placing a non-image area at the outer periphery of an image area increases chip area and is thus unsuitable for downsizing solid-state imaging devices.

A known phenomenon, which is referred to as vignetting or shading, is that when light is projected on a solid-state imaging device through the lens, the amount of light drops more at the peripheral portion than at the center of the solid-state imaging device, and it is necessary to make a correction for the amount of light reduced, in image processing.

In camera shooting, a main subject is generally placed at the center of an image. In other words, an image area with high priority is an image projected at the center, not on the outer circle, of the image circle.

In view of this, the present disclosure has an object to provide a solid-state imaging device and an imaging apparatus that enable individual identification and are suitable for downsizing applications.

Solution to Problem

To overcome problems as described above, a solid-state imaging device according to one aspect of the present disclosure includes a pixel array that is quadrilateral and includes pixels arranged in rows and columns, where each of the pixels accumulates an electric charge resulting from photoelectric conversion. The pixel array includes: a first area including first pixels for obtaining a captured image; and a second area including a second pixel for individually identifying the solid-state imaging device. The second area is provided in the vicinity of at least one corner among four corners of the pixel array, where the vicinity is a range of a predetermined number of pixels away from the at least one corner. The second pixel includes circuit elements or optical elements different from circuit elements or optical elements in each of the first pixels.

To overcome the above-described problems, an imaging apparatus according to one aspect of the present disclosure includes: the solid-state imaging device that captures an image of a subject; an imaging optical system that guides incident light from the subject to the solid-state imaging device; and a signal processing circuit that processes an output signal from the solid-state imaging device.

Advantageous Effects

The solid-state imaging device and the imaging apparatus according to the present disclosure enable individual identification of the solid-state imaging device without increasing chip area.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 4A is a circuit diagram illustrating one example of the detailed configuration of a first pixel in FIG. 3.

FIG. 4B is a timing chart illustrating the readout operation of the first pixel illustrated in FIG. 4A.

FIG. 5A is a circuit diagram illustrating one example of the detailed configuration of a second pixel in FIG. 3.

FIG. 5B is a timing chart illustrating the readout operation of the second pixel illustrated in FIG. 5A.

FIG. 6A is a circuit diagram illustrating one example of the detailed configuration of a second pixel when two second pixels that are second pixels in FIG. 3 are disposed in a solid-state imaging device.

FIG. 6B is a timing chart illustrating the readout operations of the two second pixels illustrated in FIG. 6A.

FIG. 7A is a circuit diagram illustrating the configuration of a second pixel in FIG. 3 according to another form example.

FIG. 7B is a timing chart illustrating the readout operation of the second pixel illustrated in FIG. 7A.

FIG. 8A is a circuit diagram illustrating the configuration of a second pixel in FIG. 3 according to another form example.

FIG. 8B is a timing chart illustrating the readout operation of the second pixel illustrated in FIG. 8A.

FIG. 8C is a circuit diagram illustrating the configuration of a second pixel, which is illustrated in FIG. 8A, according to a variation.

FIG. 9 is a diagram illustrating a working example of changing, with the use of optical elements, the output of an amplifier transistor included in a second pixel in FIG. 3.

FIG. 10 is a diagram illustrating another example of changing, with the use of optical elements, the output of the amplifier transistor included in a second pixel in FIG. 3.

FIG. 15 is a diagram illustrating examples of individual identification information obtained by combining the pixel chips illustrated in FIG. 13 and the circuit chips illustrated in FIG. 14.

FIG. 17 is a circuit diagram illustrating the configuration of a third pixel having a function of selectively choosing between a mode of operating as a first pixel and a mode of operating as a second pixel.

FIG. 18A is a timing chart illustrating a first readout operation (the operation as a first pixel) performed by the third pixel illustrated in FIG. 17.

FIG. 18B is a timing chart illustrating a second readout operation (the operation of pixel identification with zero amplitude) performed by the third pixel illustrated in FIG. 17.

FIG. 18C is a timing chart illustrating a third readout operation (the operation of pixel identification with amplitude) performed by the third pixel illustrated in FIG. 17.

DESCRIPTION OF EMBODIMENTS

Hereinafter, embodiments for implementing the present techniques will be described. The embodiments are each a specific example of the present disclosure. Numerical values, shapes, materials, elements, the arrangement and connection of the elements, steps, orders of steps, etc. in the embodiments are merely examples and do not intend to limit the present disclosure. In the present specification, a "voltage" at one location means an "electric potential" with a ground potential serving as a reference. Moreover, the expression "on A" or "above A" may include not only the meaning of "on the upper side and in contact with A" but also the meaning of "on the upper side and not in contact with A".

(Basic Form (Embodiment))

Figure 1:
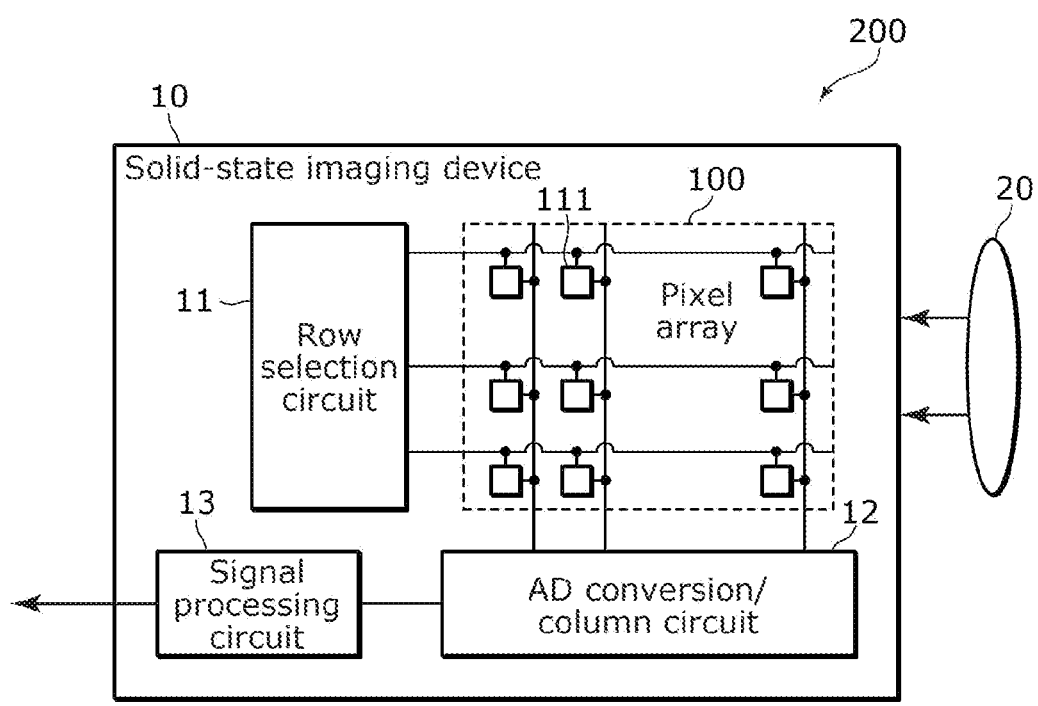
FIG. 1 is a diagram illustrating the configuration of an imaging apparatus including a solid-state imaging device according to an embodiment.

FIG. 1 is a block diagram illustrating the configuration of imaging apparatus 200, as a camera or a camera module such as an endoscope, which includes solid-state imaging device 10 according to the present embodiment.

Imaging apparatus 200 includes solid-state imaging device 10 and lens 20 as an imaging optical system that guides incident light from a subject to solid-state imaging device 10. Solid-state imaging device 10 includes pixel array 100, row selection circuit 11, AD conversion/column circuit 12, and signal processing circuit 13. Signal processing circuit 13 is included in solid-state imaging device 10 in the present embodiment, but may be provided outside solid-state imaging device 10.

The light from the subject is projected on pixel array 100 in solid-state imaging device 10 through lens 20. Pixel array 100 has a quadrilateral shape and includes pixels arranged in rows and columns, where each of the pixels accumulates an electric charge resulting from photoelectric conversion.

The light projected on pixel array 100 is photoelectrically converted in each of the pixels, and an obtained electrical signal is read out by a control signal from row selection circuit 11.

The readout signal is transferred to signal processing circuit 13 via AD conversion/row circuit 12, signal processed in signal processing circuit 13, and outputted, as image data, to the outside of the chip serving as solid-state imaging device 10.

Pixel array 100 includes first pixels 111 arranged in a matrix. First pixel 111 has a light-receiving portion including a photoelectric conversion element that performs photoelectric conversion. The photoelectric conversion element is, for example, a photosensitive element such as a photodiode or a photogate, a photoelectric conversion layer made of amorphous silicon, or an organic photoelectric conversion layer. Pixel array 100 also includes, besides first pixels 111, a second pixel (not shown) for individually identifying solid-state imaging device 10. The second pixel will be described later with reference to, for instance, FIG. 3.

Figure 2:
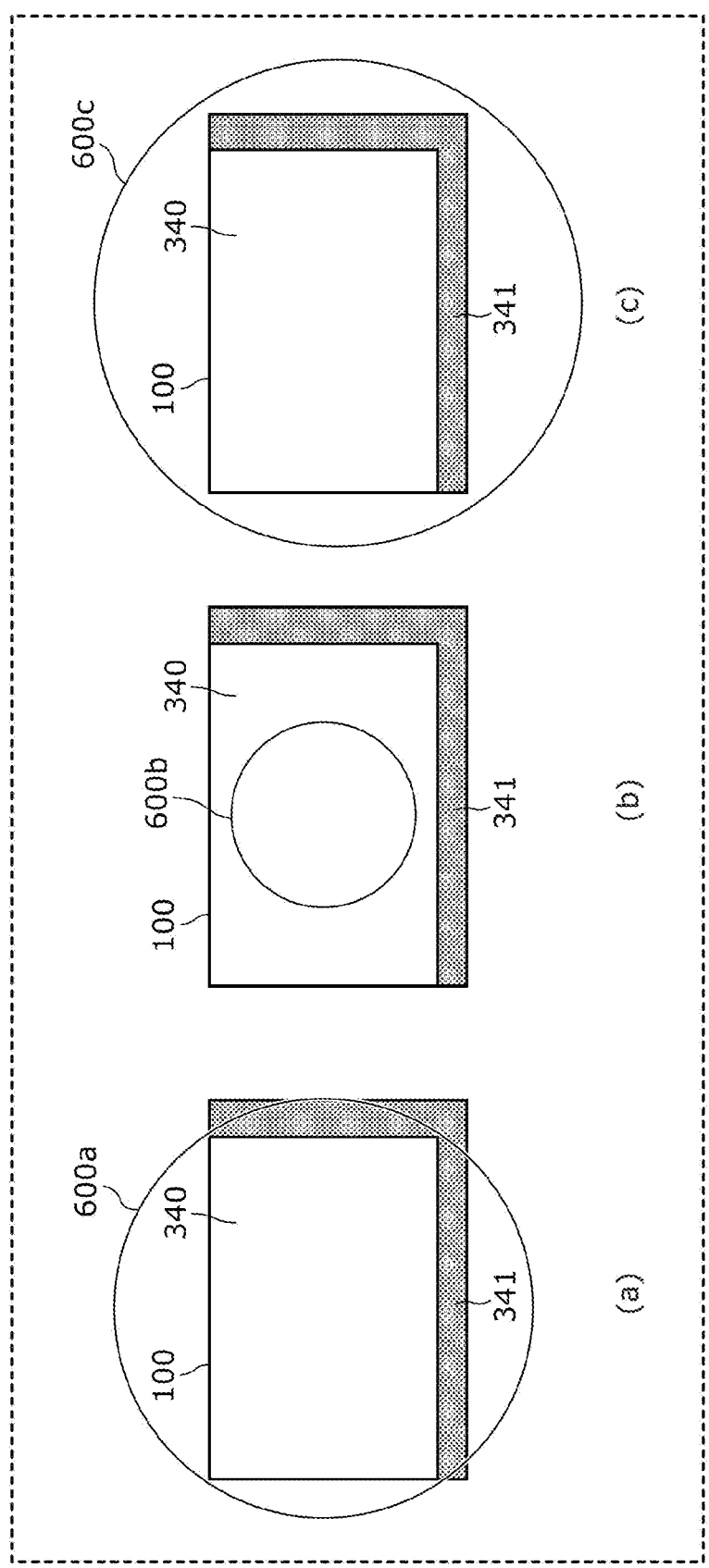
FIG. 2 is a diagram illustrating the relationship, in FIG. 1, between a pixel array and light that has passed through the lens.

FIG. 2 is a diagram illustrating the relationship, in FIG. 1, between pixel array 100 and light that has passed through lens 20.

The light having passed through lens 20 is projected in a circular shape, and this circular area is referred to as image circle 600a, 600b, or 600c. Pixel array 100 includes an area used as an image signal (i.e., image area 340) and an area not used as an image signal (i.e., non-image area 341). Non-image area 341 includes a second area including a second pixel for individually identifying solid-state imaging device 10. Placing the area used as an image signal (i.e., image area 340) in pixel array 100 in each of image circles 600a through 600c enables projecting light from a subject in image area 340. The size of image circles 600a through 600c varies depending on the relative distance between solid-state imaging device 10 and lens 20. The size of image circles 600a through 600c varies depending on the aperture of lens 20 even though the relative distance is the same.

In FIG. 2, (a) illustrates the case where image circle 600a circumscribes around image area 340 in pixel array 100, (b) illustrates the case where image circle 600b is within image area 340 in pixel array 100, and (c) illustrates the case where image circle 600c encompasses the whole pixel array 100. In general, the location of the image circle in a camera or a camera module is defined in the range from image circle 600b in (b) to image circle 600c in (c) in FIG. 2 so that an area in which an image is formed from a subject through the lens is appropriate.

Figure 3:
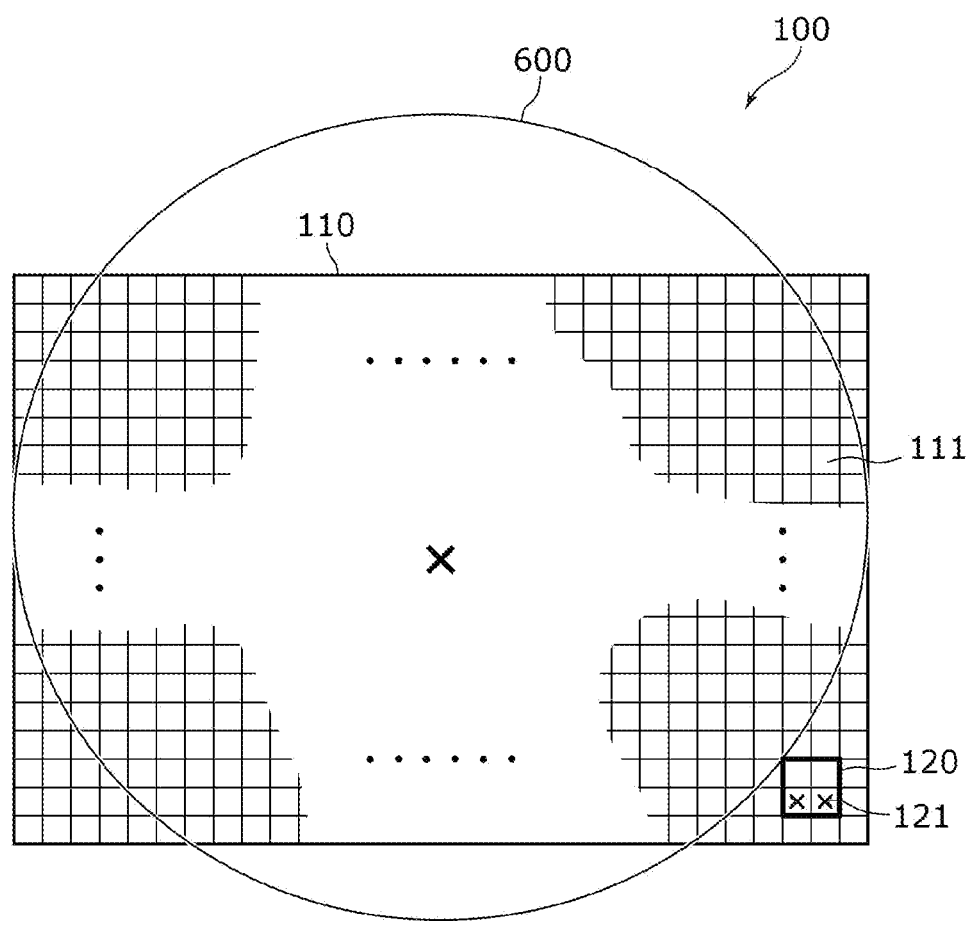
FIG. 3 is a diagram illustrating one example of components of the pixel array in FIG. 1.

FIG. 3 is a diagram illustrating one example of components of pixel array 100 in FIG. 1.

Pixel array 100 is quadrilateral in plan view and includes first area 110 including first pixels 111 for obtaining a captured image and second area 120 including second pixel 121 for individually identifying solid-state imaging device 10. Second area 120 is provided in the vicinity of at least one corner among four corners of pixel array 100, where the vicinity is a range of a predetermined number of pixels away from the at least one corner. The predetermined number is, for instance, 100, 50, 10, or 5. The vicinity may be inside the quadrilateral of pixel array 100 and outside a circle that contacts at least one side of two opposing sides of the quadrilateral or a circle that is inside the quadrilateral and contacts neither of the two opposing sides (circle 600 that contacts two shorter sides, here). The vicinity may be inside the quadrilateral of pixel array 100 and outside circle 600 that contacts two opposing longer sides of the quadrilateral, which is different from the example illustrated in FIG. 3. Circle 600 is typically an image circle, but does not need to match any one of the image circles illustrated in FIG. 2.

Second area 120 is provided at the lower right corner of pixel array 100 in FIG. 3, but may be provided at two or more corners.

Although second area 120 is between portions of first area 110 (i.e., surrounded by first area 110) in FIG. 3, the entire corner between the portions may be defined as second area 120.

Second area 120 may be provided with, besides a pixel for individual identification, a light-blocked pixel (an optical black (OB) pixel) or first pixel 111.

First area 110 may be provided with, besides pixels for obtaining a captured image, a light-blocked pixel (an OB pixel) or a pixel that enables individual identification.

FIG. 4A is a circuit diagram illustrating one example of the detailed configuration of first pixel 111 (i.e., a circuit element) in FIG. 3.

First pixel 111 includes: photodiode 401 that generates a signal charge by photoelectric conversion; amplifier transistor 402 that outputs an amplified signal according to the amount of signal charge; floating diffusion (FD) portion 406; transfer transistor 403 that transfers, to FD portion 406, the signal charge generated by photodiode 401; reset transistor 404 for resetting FD portion 406; and selection transistor 405 for selecting this first pixel 111. Selection transistor 405 brings, by drive pulse signal SEL, pixel signal line 420 and amplifier transistor 402 into conduction only for first pixels 111 included in the row to be read out. Reset transistor 404 resets FD portion 406 to the initial voltage by drive pulse signal RS. Transfer transistor 403 transfers, by drive pulse signal TG, the signal accumulated by photodiode 401 to FD portion 406. Constant current source circuit 410 and amplifier transistor 402 whose drain is connected to the power supply output, as a voltage, the signal transferred to FD portion 406 to pixel signal line 420 via selection transistor 405.

Drive pulse signals SEL, TG, and RS illustrated in FIG. 4A are the details of control signals transferred by pixel control signal lines connecting row selection circuit 11 and the pixels in FIG. 1. φ in FIG. 4A denotes a drive pulse signal.

FIG. 4B is a timing chart illustrating the readout operation of first pixel 111 illustrated in FIG. 4A.

At time t1, the gate potential (drive pulse signal SEL) of selection transistor 405 is at H level and first pixels 111 are connected to pixel signal line 420, i.e., a readout row is selected. At time t2, the gate (drive pulse signal RS) of reset transistor 404 is at H level and FD portion 406 is reset to the initial voltage. At time t4, the gate (drive pulse signal TG) of transfer transistor 403 is at H level and the signal of photodiode 401 is transferred to FD portion 406. AD conversion/column circuit 12 operates to process the difference between the reset signal at time t3 and the signal component at time t5 as the signal component of photodiode 401, and this signal component becomes the signal output of first pixel 111.

FIG. 5A is a circuit diagram illustrating one example of the detailed configuration of second pixel 121 in FIG. 3.

Second pixel 121 includes: photodiode 501 that generates a signal charge by photoelectric conversion; amplifier transistor 502 that outputs an amplified signal according to the amount of signal charge; floating diffusion (FD) portion 506; transfer transistor 503 that transfers, to FD portion 506, the signal charge resulting from the photoelectric conversion by photodiode 501; reset transistor 504 for resetting FD portion 506; and selection transistor 505 for selecting this second pixel 121. Selection transistor 505 brings, by drive pulse signal SEL, pixel signal line 520 and amplifier transistor 502 into conduction only for second pixels 121 included in the row to be read out. Reset transistor 504 resets FD portion 506 to the initial voltage by drive pulse signal RS. A signal line that supplies a different voltage is connected to the source-side of transfer transistor 503. More specifically, the signal line is connected to output Y (terminal) of selector 521 that is provided outside second pixel 121 and outputs, from output Y, A (terminal) or B (terminal) of two inputs in accordance with the polarity of selection signal S. The source-side voltage of transfer transistor 503 (output Y of selector 521) is set for FD portion 506 by drive pulse signal TG. Constant current source circuit 510 and amplifier transistor 502 whose drain is connected to the power supply output, as a voltage, the signal transferred to FD portion 506 to pixel signal line 520 via selection transistor 505.

One or more of the connections of the circuit elements included in second pixel 121 are thus different from the connections of the circuit elements included in first pixel 111 (in this example, the source of transfer transistor 503 is connected to output Y of selector 521, not to photodiode 501). This makes the gate potential of amplifier transistor 502 in second pixel 121 different from the gate potential of amplifier transistor 402 in first pixel 111 (i.e., a fixed potential that does not depend on the amount of light) when second pixel 121 and first pixel 111 are irradiated with the same amount of light. As a result, the output potential of amplifier transistor 502 in second pixel 121 differs from the output potential of amplifier transistor 402 in first pixel 111 when second pixel 121 and first pixel 111 are irradiated with the same amount of light. This enables using second pixel 121 for individual identification.

Thus, the expression "a second pixel including circuit elements different from the circuit elements included in a first pixel" includes also a pixel whose wiring is different from the wiring of the first pixel or a pixel whose signal source (drive source) connected to the first pixel is different.

FIG. 5B is a timing chart illustrating the readout operation of second pixel 121 illustrated in FIG. 5A.

At time t1, the gate potential (drive pulse signal SEL) of selection transistor 505 is at H level and second pixels 121 are connected to pixel signal line 520, i.e., a readout row is selected. At time t2, the gate (drive pulse signal RS) of reset transistor 504 is at H level and FD portion 506 is reset to the initial voltage. At time t4, the gate (drive pulse signal TG) of transfer transistor 503 is at H level and the output of selector 521 is set for FD portion 506. AD conversion/column circuit 12 operates to process the difference between the reset signal at time t3 and the signal component at time t5 as the signal component of second pixel 121, and this signal component becomes the signal output of second pixel 121.

When selection signal S of selector 521 is at L level, an electric potential (voltage A) that is the same as a reset voltage, which is one example of a first signal potential, is set for FD portion 506. The signal component of second pixel 121 is therefore zero.

When selection signal S of selector 521 is at H level, a ground (GND) potential, which is one example of a second signal potential, is set for FD portion 506. What is obtained by amplifying the difference between the reset voltage of FD portion 506 and the GND potential therefore becomes the signal component of second pixel 121. The gate potential of amplifier transistor 502 in second pixel 121 is thus switched to an electric potential selected from at least two types of electric potentials including the first signal potential and the second signal potential.

In the example illustrated in FIG. 5B, the two inputs of the selector are illustrated as being a reset voltage and a GND potential, but are not limited to this example. The two inputs may include a voltage between the reset voltage and the GND potential, or may be open (a floating potential).

Such a configuration as described above enables attaining the signal amplification of second pixel 121 that does not depend on outside light and is usable for individual identification.

FIG. 6A is a circuit diagram illustrating one example of the detailed configuration of second pixel 121 when two second pixels 121 that are second pixels 121 in FIG. 3 are provided in solid-state imaging device 10. FIG. 6A illustrates how solid-state imaging device 10 can be individually identified.

The circuit diagram of each of second pixels 121a and 121b is the same as the circuit diagram of second pixel 121 illustrated in FIG. 5A. In FIG. 6A, the circuit diagram of second pixel 121b is omitted. The circuit elements in FIG. 6A are assigned with the 600s replacing the reference signs (the 500s) of the corresponding circuit elements in FIG. 5A.

In the example illustrated in FIG. 6A, selector 621 connected to second pixel 121b selects the reset voltage (voltage A) out of the two inputs and outputs the reset voltage from output Y1. Selector 622 connected to second pixel 121b selects the GND potential (voltage B) out of the two inputs and outputs the GND potential from output Y2.

FIG. 6B is a timing chart illustrating the readout operations of two second pixels 121a and 121b illustrated in FIG. 6A. The readout operations are each the same as illustrated in FIG. 5B. At time t1, the gate potential (drive pulse signal SEL) of selection transistor 605 is at H level and the row including second pixels 121a and 121b is selected. At time t2, the gate (drive pulse signal RS) of reset transistor 604 is at H level and FD portion 606 is reset to the initial voltage. At time t4, the gate (drive pulse signal TG) of transfer transistor 603 is at H level and the output of selector 621 and the output of selector 622 are set for the respective FD portions 606. AD conversion/column circuit 12 operates to process the difference between the reset signal at time t3 and the signal component at time t5 as the signal component of each of the pixels, and this signal component becomes the signal output of each of second pixels 121a and 121b.

Selector 621 supplies the GND potential to second pixel 121a whereas selector 622 supplies the reset voltage to second pixel 121b. The signal output of second pixel 121a and the signal output of second pixel 121b are signal component 61 and signal component 62 respectively output by pixel signal lines 620a and 620b, as illustrated in FIG. 6B.

Processing, as individual identification information, location (address) information of second pixels 121a and 121b as well as signal components 61 and 62 enables individual identification of each solid-state imaging device 10.

In the example illustrated in FIG. 6A, the polarities of the selection signals to be input to selectors 621 and 622 allow four kinds of combinations.

Placing many second pixels 121 as described above enables setting more unique individual identifications.

In the example illustrated in FIG. 6A, the two inputs of the selector are illustrated as being a reset voltage and a GND potential, but are not limited to this example. The two inputs may include a voltage between the reset voltage and the GND potential, or may be open.

Furthermore, the inputs of a selector need not be two, and a supplied potential may be varied depending on the location of each of second pixels.

Since an output potential can be varied depending on an input potential, the output potential can be also treated as a multi-value.

In the example illustrated in FIG. 6A, second pixels 121a and 121b are arranged adjacent to each other in the lateral direction, but the same effect is obtained even when second pixels 121a and 121b are arranged adjacent to each other in the vertical direction or arranged in discrete locations.

Such a configuration as described above enables attaining the signal amplification of second pixel 121 that does not depend on outside light and is usable for individual identification.

The above-described configuration also enables obtaining information necessary for individual identification at the same readout timing as that of first pixel 111.

Since this second pixel 121 is located at the corner of pixel array 100, as illustrated in FIG. 3, a subject is not to be affected. The second area can be used as a captured image unless light is blocked, for instance.

As described above, solid-state imaging device 10 according to the present embodiment includes pixel array 100 that is quadrilateral and includes pixels arranged in rows and columns, where each of the pixels accumulates an electric charge resulting from photoelectric conversion. Pixel array 100 includes: first area 110 including first pixels 111 for obtaining a captured image; and second area 120 including second pixel 121 for individually identifying solid-state imaging device 10. Second area 120 is provided in the vicinity of at least one corner among four corners of pixel array 100, where the vicinity is a range of a predetermined number of pixels away from the at least one corner. Second pixel 121 includes circuit elements or optical elements different from circuit elements or optical elements in each of first pixels 111.

Pixel array 100 thus includes first pixels 111 for obtaining a captured image and second pixel 121 for individually identifying solid-state imaging device 10. Second pixel 121 is provided in the vicinity of at least one corner among four corners of pixel array 100, where the vicinity is a range of a predetermined number of pixels from the at least one corner. Solid-state imaging device 10 that enables individual identification and is suitable for downsizing applications is therefore achieved.

The vicinity may be inside the quadrilateral of pixel array 100 and outside a circle that contacts at least one of two opposing sides of the quadrilateral or a circle that is inside the quadrilateral and contacts neither of the two opposing sides (circle 600 that contacts two opposing sides, here). Since second pixel 121 is disposed outside the image circle, the chip area of solid-state imaging device 10 which is used, for instance, in endoscopes can be reduced.

Second pixel 121, as one example, includes one or more circuit elements that are same as the circuit elements in each of first pixels 111, and one or more of the connections of the circuit elements in second pixel 121 are different from the connections of the circuit elements in each of first pixels 111. The circuit elements in each of first pixel 111 and second pixel 121 include an amplifier transistor, and the output potential of amplifier transistor 502 in second pixel 121 is different from the output potential of amplifier transistor 402 in each of first pixels 111 when second pixel 121 and first pixels 111 are irradiated with the same amount of light. Thus, second pixel 121 enables outputting individual identification information irrespective of the amount of irradiated light.

The gate potential of amplifier transistor 502 in second pixel 121 is different from the gate potential of amplifier transistor 402 in each of first pixels 111 when second pixel 121 and first pixels 111 are irradiated with the same amount of light. This allows the output of amplifier transistor 502 in second pixel 121 to be used as individual identification information.

The gate potential of amplifier transistor 502 in second pixel 121 is switched to an electric potential selected from among at least two types of electric potentials including a first signal potential and a second signal potential. This allows two or more different pieces of individual identification information to be output from amplifier transistor 502 in each of second pixels 121.

The circuit elements in each of first pixel 111 and second pixel 121 include a reset transistor, and the first signal potential is the same as the drain potential of reset transistor 504 in second pixel 121. This allows information indicating a reset potential to be output from second pixel 121 as individual identification information.

The second signal potential is the same as the ground potential of second pixel 121. This allows information, which is the same as information corresponding to when photodiode 501 receives strong light and is saturated, to be output from second pixel 121 as individual identification information.

The circuit elements in each of first pixel 111 and second pixel 121 include a reset transistor, and the gate potential of amplifier transistor 502 in second pixel 121 is the same as the drain voltage of reset transistor 504 in second pixel 121. This allows information, which is the same as information corresponding to when FD portion 506 is reset, to be output as individual identification information.

The gate potential of amplifier transistor 502 in second pixel 121 is the same as the ground potential of second pixel 121. This allows information, which is the same as information corresponding to when photodiode 501 receives strong light and is saturated, to be output from second pixel 121 as individual identification information.

Imaging apparatus 200 according to the present embodiment includes: solid-state imaging device 10 having the characteristics as described above; lens 20 as an imaging optical system that guides incident light from a subject to solid-state imaging device 10; and signal processing circuit 13 that processes an output signal from solid-state imaging device 10.

Since solid-state imaging device 10 having such a characteristic configuration as described above is included in imaging apparatus 200, solid-state imaging device 10, which is suitable for applications to camera modules such as endoscopes, that enables individual identification and is suitable for downsizing applications is achieved.

(Another Form 1 for Changing Amplifier Transistor's Output)

Although the output of selector 521 is connected to the source-side of transfer transistor 503 in FIG. 5A, the output of selector 521 may be directly connected to the gate of amplifier transistor 502 without via transfer transistor 503.

FIG. 7A is a circuit diagram illustrating the configuration of second pixel 121 according to another form example.

Second pixel 121 includes: photodiode 701; amplifier transistor 702 that outputs an amplified signal according to the amount of signal charge; transfer transistor 703 that transfers a signal charge resulting from photoelectric conversion performed by photodiode 701; reset transistor 704; selection transistor 705; and floating diffusion (FD) portion 706. Selection transistor 705 brings, by drive pulse signal SEL, amplifier transistor 702 and pixel signal line 720 corresponding to the readout row into conduction. Reset transistor 704 resets FD portion 706 to the initial voltage by drive pulse signal RS. The source-side of transfer transistor 703 is connected to a signal line that supplies a different voltage, and is connected to output Y of selector 721 that outputs, from output Y, A or B of two inputs in accordance with the polarity of selection signal S. The circuit elements in FIG. 7A are assigned with the 700s replacing the reference signs (the 500s) of the corresponding circuit elements in FIG. 5A.

FIG. 7B is a timing chart illustrating the readout operation of second pixel 121 illustrated in FIG. 7A.

Since FD portion 706 and amplifier transistor 702 are disconnected, as illustrated in FIG. 7A, the timings of drive pulse signals RS and TG are shown in FIG. 7B, although not related to the readout operation in FIG. 7A, to clearly show the timing of selection signal S of selector 721.

At time t1, the gate potential (drive pulse signal SEL) of selection transistor 705 is at H level and second pixels 121 are connected to pixel signal line 720, i.e., a readout row is selected. Since selection signal S of selector 721 is at L level, output Y is voltage A (reset voltage) and the reset voltage is applied to the gate of amplifier transistor 702. At time t4, selection signal S is at H level and output Y of selector 721 is switched to voltage B (GND potential). This results in voltage B (GND potential) being applied to the gate of amplifier transistor 702.

In AD conversion/column circuit 12, voltage A and voltage B are applied to the gate of amplifier transistor 702 with voltage A at t3 as a reset reference and voltage B at t5 as the signal component of voltage B, and AD conversion/column circuit 12 operates to process the output difference thereof as the signal output of second pixel 121.

Such a configuration as described above enables attaining the signal amplitude of second pixel 121 that does not depend on outside light and is usable for individual identification.

(Another Form 2 for Changing Amplifier Transistor's Output)

FIG. 8A is a circuit diagram illustrating the configuration of second pixel 121 in FIG. 3 according to another form example.

Second pixel 121 includes: photodiode 801; amplifier transistor 802 that outputs an amplified signal according to the amount of signal charge; transfer transistor 803 that transfers a signal charge resulting from photoelectric conversion performed by photodiode 801; reset transistor 804; selection transistor 805; and floating diffusion (FD) portion 806. Selection transistor 805 brings, by drive pulse signal SEL, amplifier transistor 802 and pixel signal line 820 corresponding to the readout row into conduction. Reset transistor 804 resets FD portion 806 to the initial voltage by drive pulse signal RS2. Transfer transistor 803 transfers, by drive pulse signal TG2, the signal accumulated by photodiode 801 to FD portion 806. The circuit elements in FIG. 8A are assigned with the 800s replacing the reference signs (the 500s) of the corresponding circuit elements in FIG. 5A.

Drive pulse signal RS2 of reset transistor 804 and drive pulse signal TG2 of transfer transistor 803 are control signals different from drive pulse signals RS and TG of first pixel 111 illustrated in FIG. 4A. In other words, the signal line connected to the gate of reset transistor 804 in second pixel 121 is connected to a circuit of a type different from the type of the circuit to which the signal line connected to the gate of reset transistor 404 in first pixel 111 is connected. The signal line connected to the gate of transfer transistor 803 in second pixel 121 is connected to a circuit of a type different from the type of the circuit to which the signal line connected to the gate of transfer transistor 403 in first pixel 111 is connected.

FIG. 8B is a timing chart illustrating the readout operation of second pixel 121 illustrated in FIG. 8A.

The timings of drive pulse signals RS and TG are shown in FIG. 8B for the sake of contrast with first pixel 111, although not related to the readout operation in FIG. 8A.

At time t1, the gate potential (drive pulse signal SEL) of selection transistor 805 rises to H level and second pixels 121 are connected to pixel signal line 820, i.e., a readout row is selected. At time t2, drive pulse signal RS2 of reset transistor 804 and drive pulse signal TG2 of transfer transistor 803 are at H level and FD portion 806 is reset to the initial voltage. During this drive, FD portion 806 is reset to the initial voltage at all times. Drive pulse signal TG2 is kept at H level to let the electric charge generated in photodiode 801 be transferred to the drain (power supply) of reset transistor 804.

Also at time t3, t4, or t5, as is the same as at time t2, AD conversion/column circuit 12 operates to process the signal output difference between time t3 and time t5 as the signal component of second pixel 121. Since there is no change in the electric potential of FD portion 806 in FIG. 8B, the signal output of this second pixel 121 is zero.

The difference from the circuit diagram in FIG. 4A is that separating reset transistor 804 and transfer transistor 803 from a signal that controls reset transistor 804 and transfer transistor 803, and driving second pixel 121 differently from the drive of first pixel 111 enable obtaining the signal output of second pixel 121 different from the signal output of first pixel 111 while keeping the existing circuit configuration (of first pixel 111).

In FIG. 8A, both of drive pulse signals RS2 and TG2 are described as being respectively different from drive pulse signals RS and TG, but only either one of drive pulse signals RS2 and TG2 may be different.

As described above, in the present form, the circuit elements in each of first pixel 111 and second pixel 121 include a reset transistor, and the signal line connected to the gate of reset transistor 804 in second pixel 121 is connected to a circuit of a type different from the type of the circuit to which the signal line connected to the gate of reset transistor 404 in each of first pixels 111 is connected. Thus, separating a control signal provided to the gate of reset transistor 804 in second pixel 121 from a signal provided to first pixel 111 can cause second pixel 121 to output individual identification information.

(Another Form 3 for Changing Amplifier Transistor's Output)

FIG. 8C is a circuit diagram illustrating the configuration of second pixel 121, which is illustrated in FIG. 8A, according to a variation.

Second pixel 121 includes: photodiode 801c; amplifier transistor 802c that outputs an amplified signal according to the amount of signal charge; transfer transistor 803c that transfers a signal charge resulting from photoelectric conversion performed by photodiode 801c; reset transistor 804c; selection transistor 805c; and floating diffusion (FD) portion 806c. Selection transistor 805c brings, by drive pulse signal SEL, amplifier transistor 802c and pixel signal line 820c corresponding to the readout row into conduction. The gate and drain of reset transistor 804c are commonalized and FD portion 806c is reset to the initial voltage at all times. The source and gate of transfer transistor 803c are fixed to the GND potential. The circuit elements in FIG. 8C are assigned with reference signs (the 800s) corresponding to the circuit elements in FIG. 8A with an index c being added to each of the reference signs.

The difference from the circuit diagram in FIG. 8A is that the gate of reset transistor 804c and the gate of transfer transistor 803c are not connected to the drive pulse source, and the electric potentials of these gates are fixed. Since the state of FD portion 806c is fixed to the reset potential, the output voltage in this case is zero.

A feature of this configuration is that adding a circuit to first pixel 111 is unnecessary and the present form for changing the output of amplifier transistor 802c can be achieved only by the circuit of second pixel 121c (i.e., only by changing the connection relationship of second pixel 121c).

(Another Form 4 for Changing Amplifier Transistor's Output)

FIG. 9 is a diagram illustrating a working example of changing, with the use of optical elements, the output of the amplifier transistor included in second pixel 121 in FIG. 3. More specifically, (a1) in FIG. 9 is a plan view of a photodiode portion (i.e., a structure including photodiode 401 and components above photodiode 401) in first pixel 111 in FIG. 3 when the photodiode portion is viewed from top. (b1) in FIG. 9 is a cross-sectional view of the photodiode portion in first pixel 111, which is obtained by cutting the photodiode portion at a plane perpendicular to the plan view. In the structure, on-chip color filter (hereinafter simply referred to as "color filter") 320 and microlens 322 are disposed above photodiode 401, i.e., on the side from which light enters. In the cross-sectional view illustrated in (b1) in FIG. 9, an upper or lower layer adjacent to photodiode 401 is a planarization film (the same applies to other cross-sectional views in FIG. 9 and FIG. 10).

(a2) in FIG. 9 is a plan view of a photodiode portion (i.e., a structure including photodiode 501 and components above photodiode 501) in second pixel 121 when the photodiode portion is viewed from top. (b2) in FIG. 9 is a cross-sectional view of the photodiode portion in second pixel 121, which is obtained by cutting the photodiode portion at a plane perpendicular to the plan view.

Color filter 320 and microlens 322 are disposed above photodiode 501, i.e., on the side from which light enters, and light-blocking film 324a is interposed between color filter 320 and photodiode 501. Owing to this structure, incident light is blocked by light-blocking film 324a and light cannot enter photodiode 501. Thus, light is blocked entirely above photodiode 501 in second pixel 121.

In other words, no light enters this second pixel 121, and this results in second pixel 121 outputting the same output (zero) at all times.

Light-blocking film 324a may be a wiring layer.

Light-blocking film 324a may partly block light above photodiode 501. A plan view and a cross-sectional view of the photodiode portion when light-blocking film 324b blocks light above half the top surface of photodiode 501 are respectively (a3) and (b3) in FIG. 9.

Defective pixels in a non-image area on which light is not incident are used in the conventional example, but any of the configurations as illustrated in FIG. 9 enables changing the output of the amplifier transistor even when light enters the pixel.

Providing a plurality of second pixels 121 having such a configuration in second area 120 and changing the combination of second pixels 121 enable individual identification.

In other words, it is possible to treat the location (address) information and output signal of this second pixel 121 as individual identification information.

Furthermore, the uniqueness of individual identification can be increased by combining such a structure using light-blocking films with chip exposure which is to be described later.

As described above, in the present form example, the circuit elements in each of first pixel 111 and second pixel 121 include a photodiode, and light is entirely or partly blocked above photodiode 501 in second pixel 121. Thus, making the structure of the photodiode portion in second pixel 121 different from the structure of the photodiode portion in first pixel 111 can cause second pixel 121 to output individual identification information.

(Another Form 5 for Changing Amplifier Transistor's Output)

FIG. 10 is a diagram illustrating another example of changing, with the use of optical elements, the output of an amplifier transistor included in second pixel 121 in FIG. 3.

Second pixel 121 has a structure in which a color filter and a microlens are disposed above a photodiode, i.e., on the side from which light enters.

(a) in FIG. 10 is a cross-sectional view of the photodiode portion in first pixel 111. The thickness of color filter 320a is T1.

(b) in FIG. 10 is a cross-sectional view of the photodiode portion in second pixel 121 according to one example. Setting thickness T2 of color filter 320b to be less than thickness T1 of color filter 320a in (a) in FIG. 10 enables inhibiting the attenuation of incident light, i.e., contributes to sensitivity enhancement.

(c) in FIG. 10 is a cross-sectional view of the photodiode portion in second pixel 121 according to another example. In (c) in FIG. 10, a color filter is not disposed. In other words, second pixel 121 illustrated in (c) in FIG. 10 has a structure in which the color filter in (a) or (b) in FIG. 10 is replaced with a planarization film. Since second pixel 121 illustrated in (c) in FIG. 10 transmits light having a full wavelength, the output of second pixel 121 is increased (i.e., second pixel 121 is overexposed) compared to second pixel 121 illustrated in (a) or (b) in FIG. 10.

(d) in FIG. 10 is a cross-sectional view of the photodiode portion in second pixel 121 according to another example. In (d) in FIG. 10, light-transmittance variable filter 325 for changing light transmittance is interposed between color filter 320a and photodiode 401. When a filter that reduces light transmittance is disposed as light-transmittance variable filter 325, it is possible, owing to the configuration illustrated in (d) in FIG. 10, to inhibit incident light from entering photodiode 401, i.e., to reduce the output of second pixel 121, compared to when light-transmittance variable filter 325 is not disposed (i.e., (a) in FIG. 10). Transmittance variable filter 325 is disposed below color filter 320a in the example in (d) in FIG. 10, but may be disposed above color filter 320a, or a color filter may not be disposed (i.e., a planarization film may be disposed) above light-transmittance variable filter 325, as in (e) in FIG. 10.

As described above, even when the same amount of light is incident on second pixel 121 and first pixel 111, the output of second pixel 121 is different from the output of first pixel 111 as a result of the following: thickness T2 of the color filter in second pixel 121 is different from thickness T1 of the color filter in first pixel 111; a color filter is not disposed in second pixel 121; or an element having a light transmission property different from a light transmission property above the photodiode in first pixel 111 is disposed in second pixel 121.

Although FIG. 10 illustrates the cross-sectional views of a single pixel, the same characteristics as those of the single pixel may be shared by a plurality of pixels. There are cases where color filters of, for example, three colors of R, G, and B are used in a real product. When the color filters have different colors, the thickness of a color filter may be varied depending on its color or only the thickness of color filters having one of the three colors may be different among all the color filters. This configuration enables changing the output of the amplifier transistor even when light enters the pixel.

Providing a plurality of second pixels 121 having such a configuration in second region 120 and changing the combination of second pixels 121 enable setting many unique individual identifications.

In other words, it is possible to treat the location (address) information and output signal of this second pixel 121 as individual identification information.

When all of pixels included in second area 120 are second pixels 121 and the thickness of the color filter in each of second pixels 121 is T2, the sensitivity of second area 120 can be enhanced although individual identification cannot be performed. Since second area 120 is located at the corner of pixel array 100 and darkening is a problem to be overcome, the effect of reducing darkening at the corner of pixel array 100 can be expected.

If some of pixels in second area 120 are first pixels 111, i.e., the thickness of the color filter in each of first pixels 111 is T1, and the remaining pixels are second pixels 121, i.e., the thickness of the color filter in each of second pixels 121 is T2, the sensitivity of each of first pixels 111 decreases. It is therefore possible to treat the location (address) information and output signal of each of first pixels 111 as individual identification information.

As described above, in the present form example, the circuit elements in each of first pixel 111 and second pixel 121 include a photodiode above which an on-chip color filter is disposed, and the thickness of at least one of on-chip color filters 320b disposed above photodiodes 501 in second area 120 is different from the thickness of each of on-chip color filters 320a disposed above photodiodes 401 in first area 110. Moreover, the circuit elements in each of first pixel 111 and second pixel 121 include a photodiode above which an on-chip color filter is disposed, and the thickness of on-chip color filter 320b disposed above photodiode 501 in second pixel 121 is different from the thickness of on-chip color filter 320a disposed above photodiode 401 in each of first pixels 111.

Thus, making the structure of the photodiode portion in second pixel 121 different from the structure of the photodiode portion in first pixel 111 can cause second pixel 121 to output individual identification information.

Specifically, the thickness of at least one of on-chip color filters 320b disposed above photodiodes 501 in second area 120 may be less than the thickness of each of on-chip color filters 320a disposed above photodiodes 401 in first area 110. Moreover, the thickness of on-chip color filter 320b disposed above photodiode 501 in second pixel 121 may be less than the thickness of on-chip color filter 320a disposed above photodiode 401 in each of first pixels 111.

This can cause second pixel 121, as compared to first pixel 111, to output, as individual identification information, a signal corresponding to the state in which the attenuation of incident light is inhibited.

Moreover, the circuit elements in each of first pixel 111 and second pixel 121 may include a photodiode, on-chip color filter 320a may be disposed above photodiode 401 in each of first pixels 111, and an on-chip color filter may not be disposed above photodiode 501 in second pixel 121. This allows information, which is the same as information corresponding to when strong light is incident on photodiode 501 and second pixel 121 is overexposed, to be output from second pixel 121 as individual identification information.

(Increased Uniqueness of Individual Identification)

Figure 11:
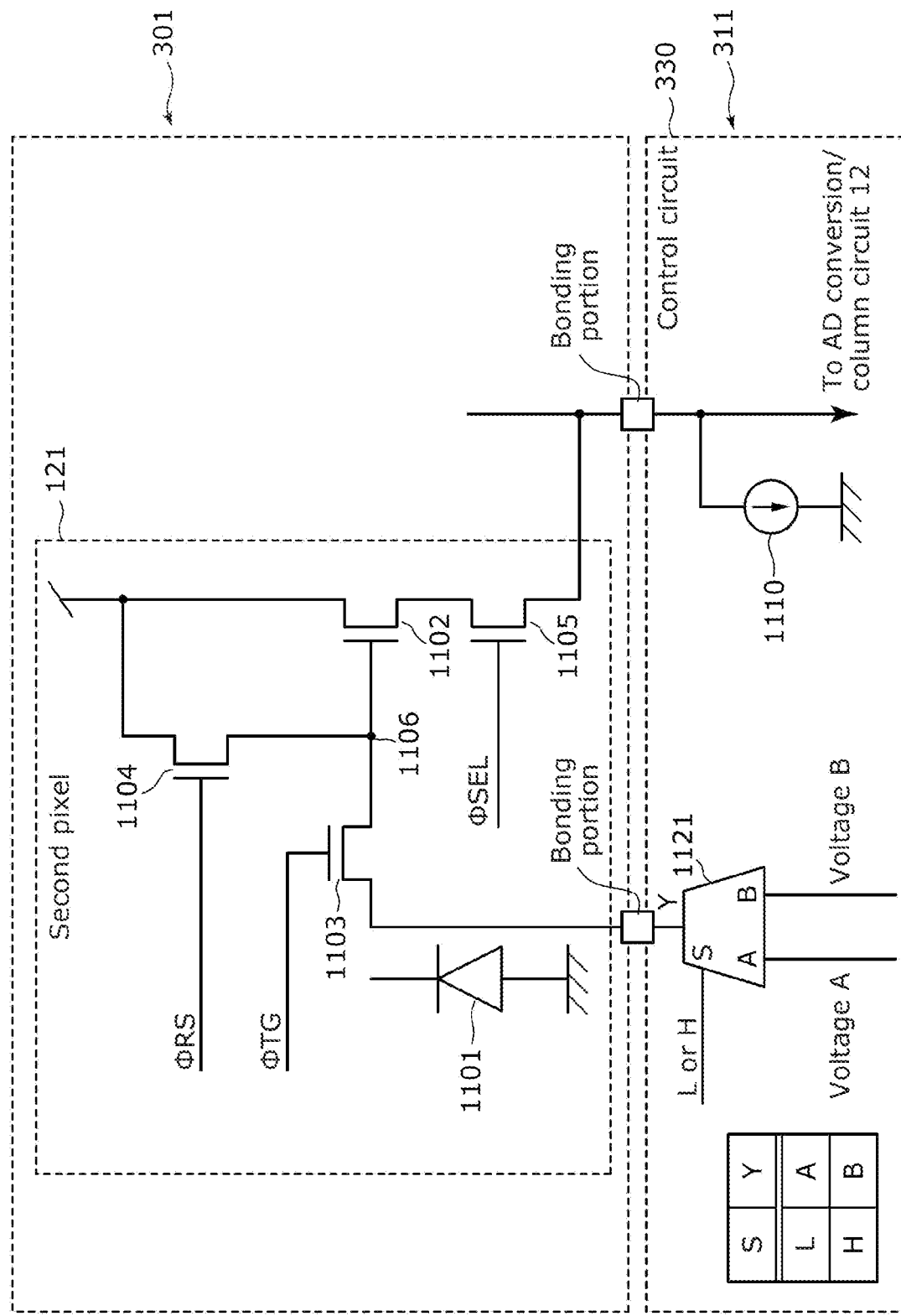
FIG. 11 is a configuration diagram of a solid-state imaging device according to an embodiment for increasing the uniqueness of individual identification.

FIG. 11 is a configuration diagram of solid-state imaging device 10 according to an embodiment for increasing the uniqueness of individual identification (i.e., generating more types of individual identification).

FIG. 11 illustrates a stacked structure in which pixel chip 301, which is a semiconductor chip including second pixel 121, is disposed on a first semiconductor substrate, circuit chip 311, which is a semiconductor chip including control circuit 330 that is a circuit other than second pixel 121, is formed on a second semiconductor substrate different from the first semiconductor substrate, and pixel chip 301 and circuit chip 311 are bonded to each other by bonding portions each of which is, for instance, a connector or solder. The circuit elements in FIG. 11 are assigned with the 1100s replacing the reference signs (the 500s) of the corresponding circuit elements in FIG. 5A.

In the example illustrated in FIG. 11, the operation of second pixel 121 is omitted due to being the same as in FIG. 5A and FIG. 5B. The difference from FIG. 5A and FIG. 5B is that the control of changing the output of amplifier transistor 1102 is performed by circuit chip 311.

Although plural stacking methods are known, pixel chip 301 and circuit chip 311 will be described as being bonded together using a wafer-on-wafer method in which a silicon wafer on which pixel chips 301 are disposed in arrays in row and column directions is bonded to a silicon wafer on which circuit chips 311 are disposed in arrays in row and column directions.

Figure 12:
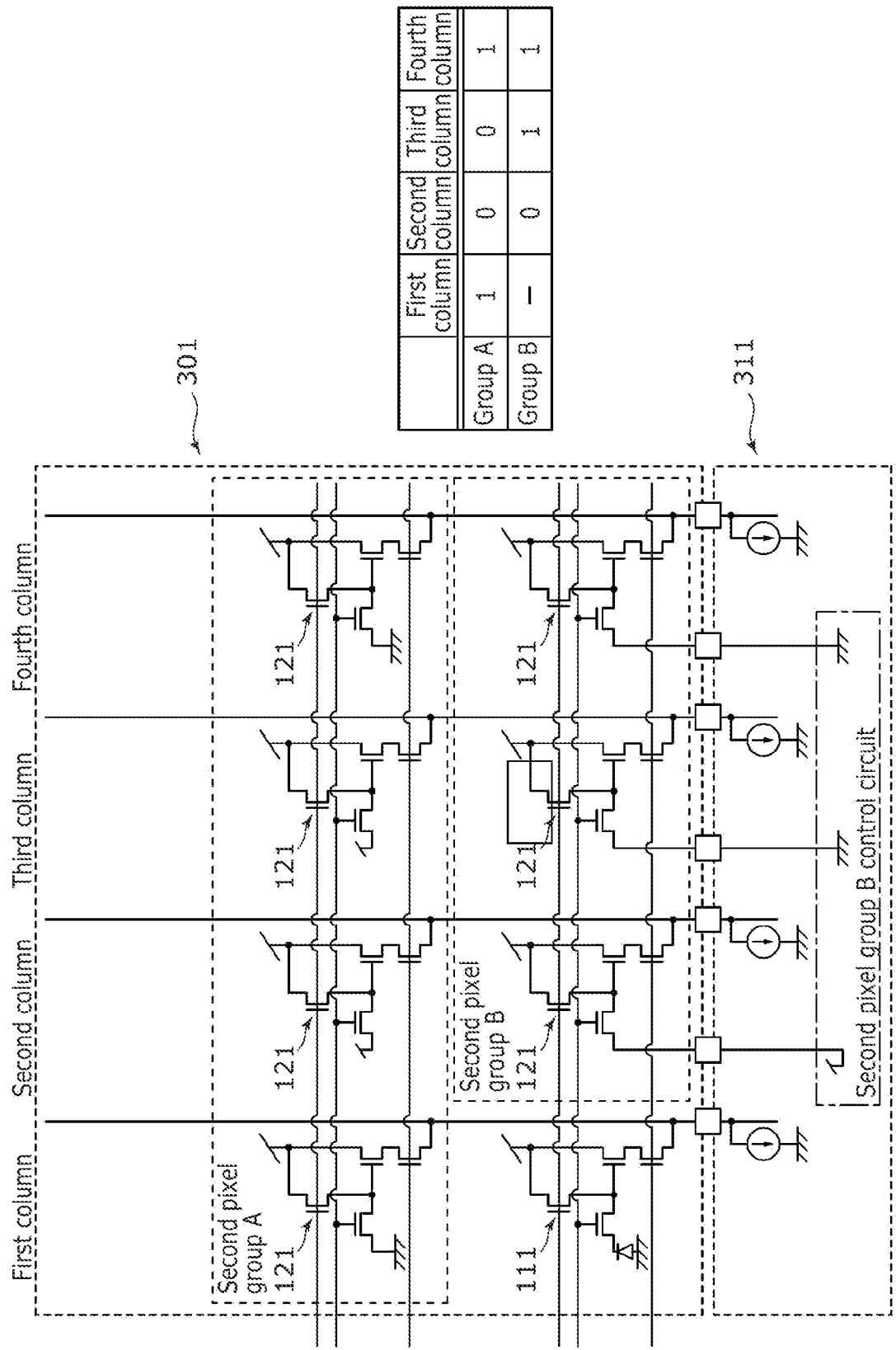
FIG. 12 is a configuration diagram of the solid-state imaging device in which a plurality of second pixels that are second pixels in FIG. 3 are provided to increase the uniqueness of individual identification.

FIG. 12 is a configuration diagram of solid-state imaging device 10 in which a plurality of second pixels 121 that are second pixels 121 in FIG. 3 are provided to increase the uniqueness of individual identification. FIG. 12 illustrates a configuration in which four second pixels 121 are disposed as a second pixel group A and three second pixels 121 are disposed as a second pixel group B.

The four second pixels 121 included in the second pixel group A are each configured, in pixel chip 301, to enable individual identification (configured to fix the source potential of the transfer transistor, here), as illustrated in FIG. 12.

The three second pixels 121 included in the second pixel group B are each configured to enable individual identification by combining pixel chip 301 and control performed by circuit chip 311.

When second pixel 121 without signal output is expressed as 0 and second pixel 121 with signal output is expressed as 1 by binarization, individual identification is as shown in the table on the right in FIG. 12.

Figure 13:
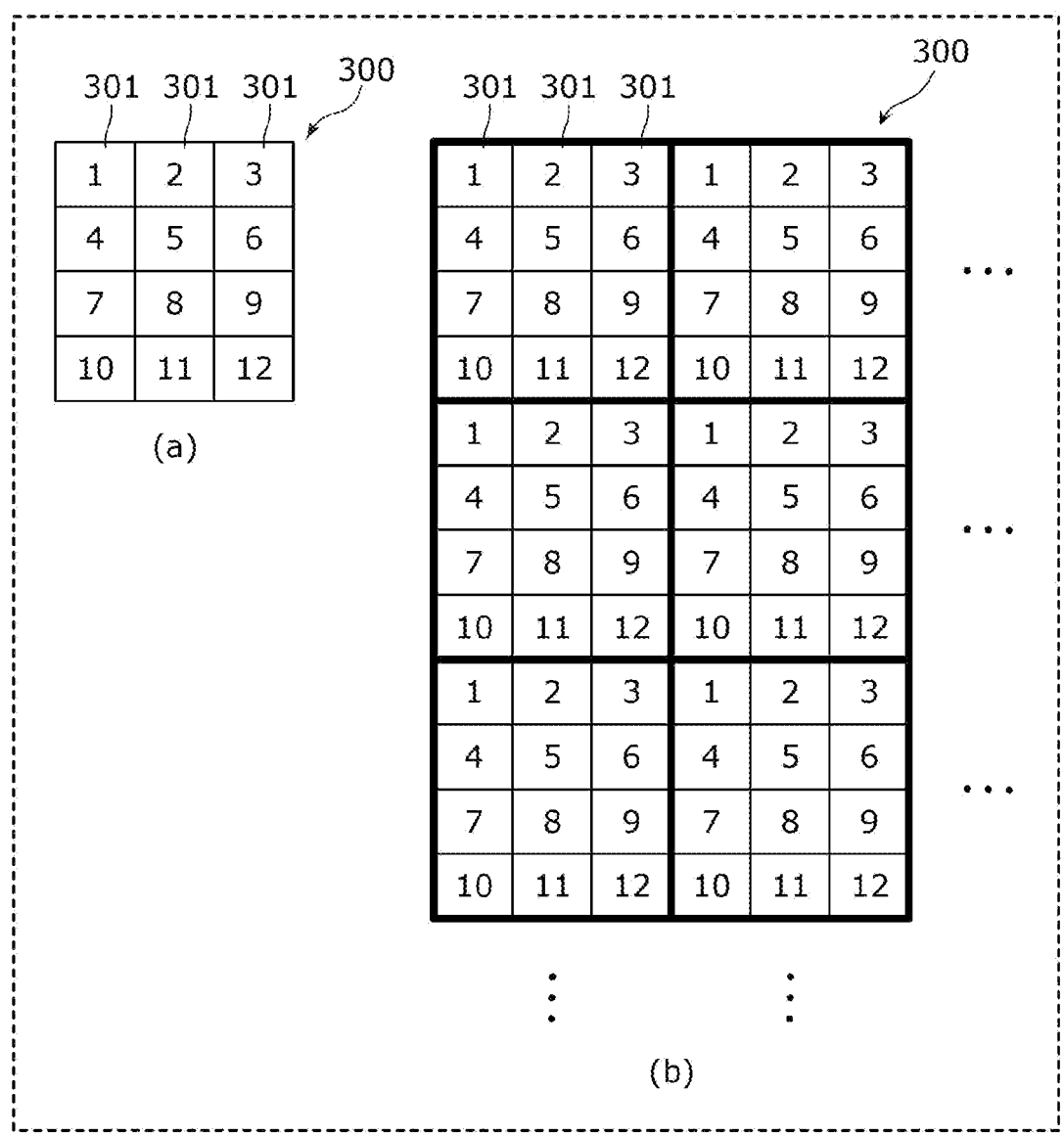
FIG. 13 is a diagram illustrating an example of the exposure array of pixel chips each of which is the pixel chip illustrated in FIG. 11.

FIG. 13 is a diagram illustrating an example of the exposure array of pixel chips 301 each of which is pixel chip 301 illustrated in FIG. 11. More specifically, (a) in FIG. 13 is a diagram illustrating a basic array configuration on a photomask when pixel chips 301 are formed on first semiconductor substrate 300. Pixel chips 301 are arranged in four rows and three columns. In this example, the identification of twelve pixel chips 301 (sixteen (=the fourth power of 2) pixel chips at maximum) is enabled by providing four second pixels 121 in each of pixel chips 301. (b) in FIG. 13 is a diagram illustrating an entire array configuration on a photomask when the basic array of four rows and three columns illustrated in (a) in FIG. 13 is exposed on the wafer.

Figure 14:
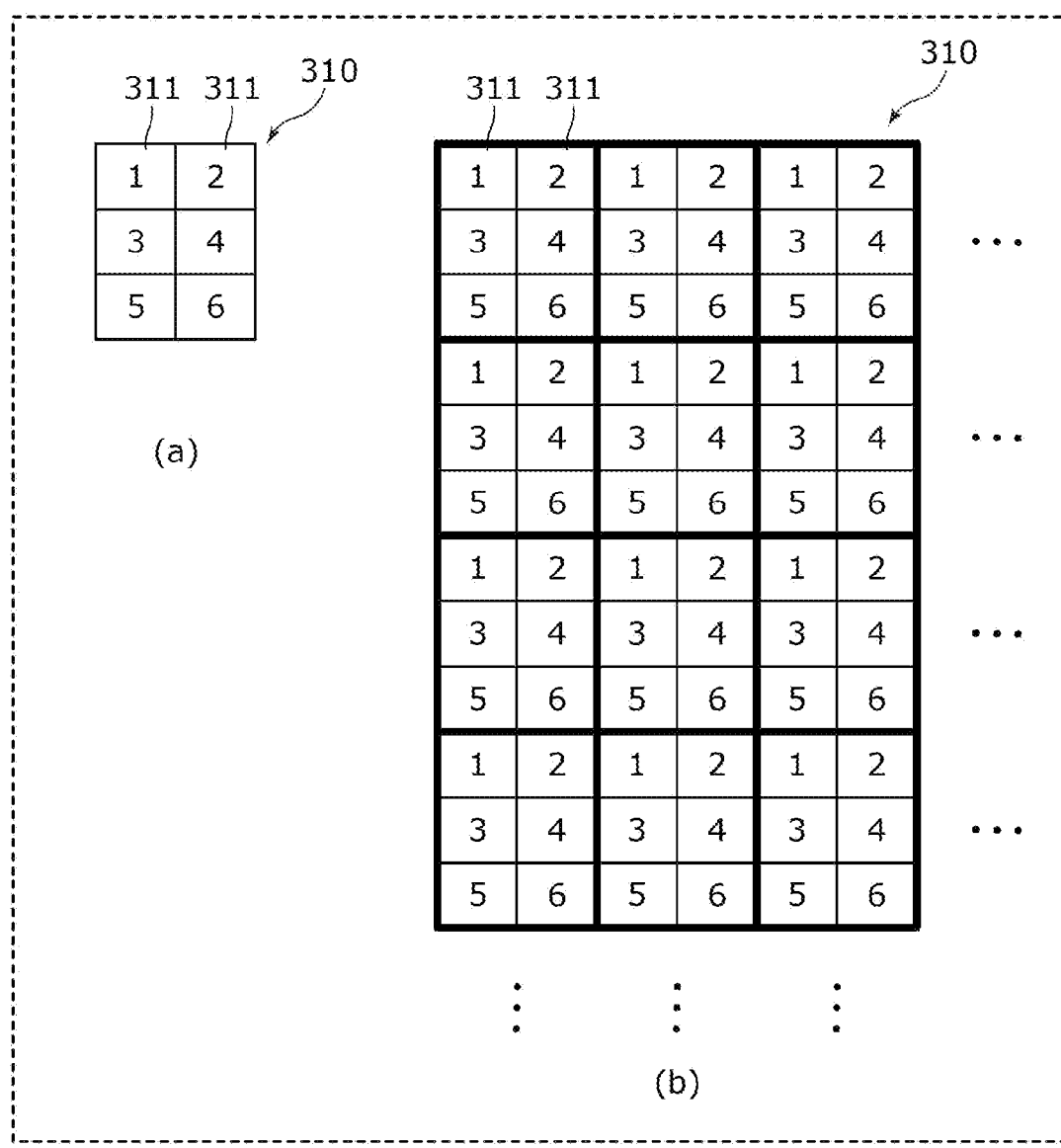
FIG. 14 is a diagram illustrating an example of the exposure array of circuit chips each of which is the circuit chip illustrated in FIG. 11.

FIG. 14 is a diagram illustrating an example of the exposure array of circuit chips 311 each of which is circuit chip 311 illustrated in FIG. 11. More specifically, (a) in FIG. 14 is a diagram illustrating a basic array configuration on a photomask when circuit chips 311 are formed on second semiconductor substrate 310. Circuit chips 311 are arranged in three rows and two columns. In this example, the identification of six circuit chips 311 (eight (=the third power of 2) circuit chips at maximum) is enabled by providing three second pixels 121 in each of circuit chips 311. (b) in FIG. 14 is a diagram illustrating an entire array configuration on a photomask when the basic array of three rows and two columns illustrated in (a) in FIG. 14 is exposed on the wafer.

FIG. 15 is a diagram illustrating examples of individual identification information obtained by combining pixel chips 301 illustrated in FIG. 13 and circuit chips 311 illustrated in FIG. 14. FIG. 15 illustrates combinations of individual identification information of a solid-state imaging device configured by stacking (i) pixel chips 301 each of which includes a second pixel group A including four second pixels and a second pixel group B including four second pixels and (ii) circuit chips 311 each of which controls the second pixel group B in pixel chip 301. The number on the left of a hyphen indicates individual identification information determined by the second pixel group A in pixel chip 301 and the number on the right of the hyphen indicates individual identification information determined by the combination of circuit chip 311 and the second pixel group B in pixel chip 301. By thus changing the shot arrangement of pixel chip 301 and circuit chip 311, the uniqueness of individual identification information in the case of stacking chips can be increased.

As described above, in the present form example, (i) solid-state imaging device 10 includes control circuit 330 that performs control of changing the output of amplifier transistor 502 in second pixel 121, (ii) pixel array 100 is one of pixel chips 301 that are two-dimensionally arranged on first semiconductor substrate 300, (iii) control circuit 330 is one of circuit chips 311 that are two-dimensionally arranged on second semiconductor substrate 310, and (iv) arrays including rows and columns of pixel chips 301 on first semiconductor substrate 300 are different from arrays including rows and columns of circuit chips 311 on second semiconductor substrate 310. This enables generating multiple pieces of individual identification information by combinations each made up of pixel chip 301 and circuit chip 311.

(Further Increased Uniqueness)

Figure 16:
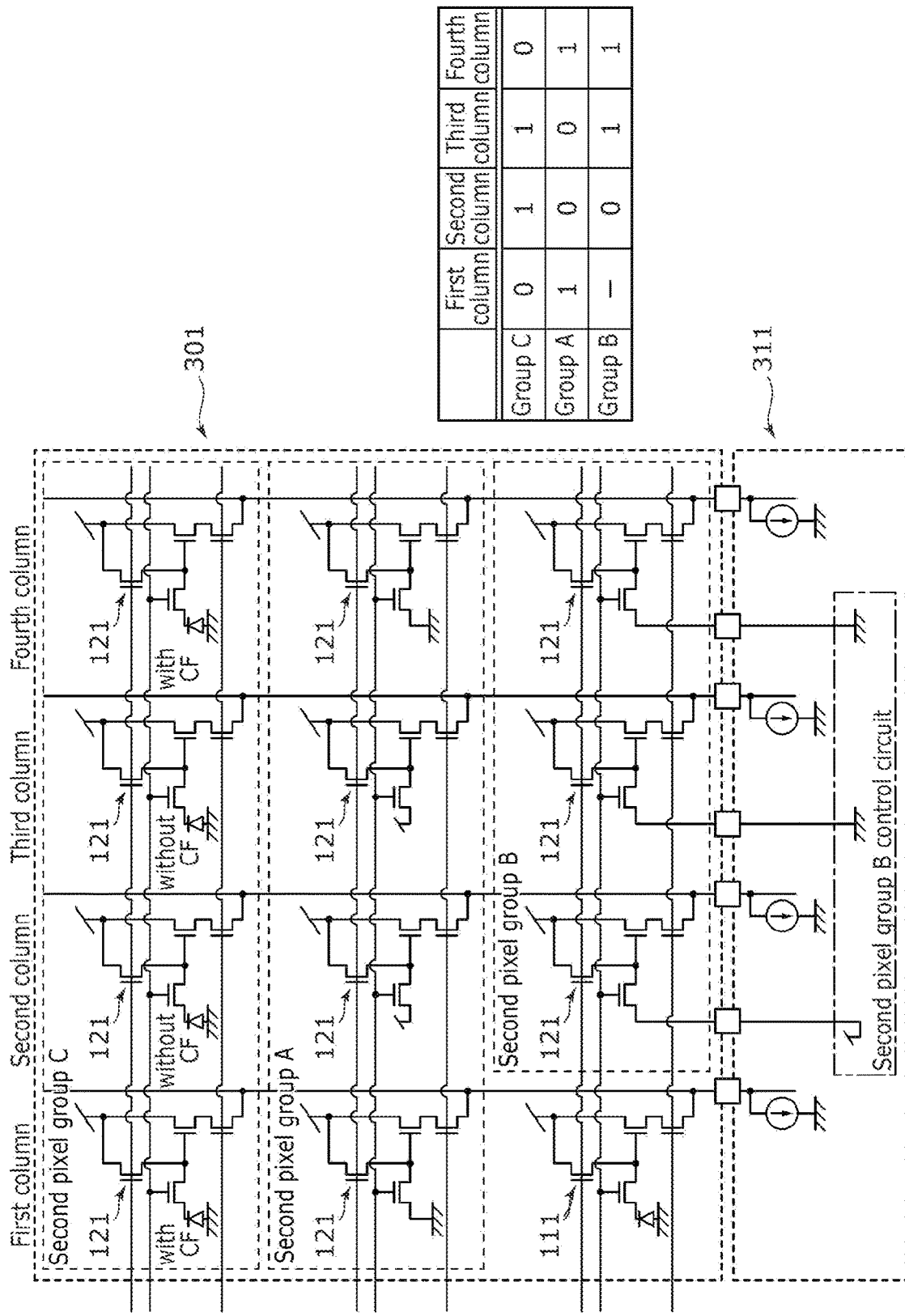
FIG. 16 is a configuration diagram of a solid-state imaging device resulting from adding also a second pixel group C to pixel groups illustrated in FIG. 12 for performing individual identification using color filters.

FIG. 16 is a configuration diagram of solid-state imaging device 10 resulting from adding also a second pixel group C to the pixel groups illustrated in FIG. 12 for performing individual identification using color filters. If the output of second pixel 121 without color filter is processed as 1 and the output of second pixel 121 with color filter is processed as 0, the outputs of the second pixels (the outputs of the second pixel group A, the second pixel group B, and the second pixel group C) according to FIG. 16 are as indicated in the table in FIG. 16. Since color filter formation is also performed by exposing a basic array on a photomask, changing the basic array of color filters can further increase the uniqueness of individual identification, as illustrated in FIG. 13 or FIG. 14.

The method described above enables providing, at the stage of manufacturing a semiconductor chip, information that enables individual identification. The method thus enables individual identification while reducing circuit scale for downsizing applications.

FIG. 17 is a circuit diagram illustrating the configuration of third pixel 131 having a function of selectively taking one of the following modes: a mode of operating as a first pixel; and a mode of operating as a second pixel.

Third pixel 131 functionally has a mode of operating as a first pixel for obtaining a captured image and a mode of operating as a second pixel for individually identifying solid-state imaging device 10. Third pixel 131 structurally has the same configuration as first pixel 111 illustrated in FIG. 4A and includes selectors 171 through 173 each of which selectively outputs, from two types of input signals, a corresponding one of three types of drive pulse signals supplied to first pixel 111, i.e., drive pulse signal SEL, drive pulse signal RS, and drive pulse signal TG. A pixel circuit having the same configuration as first pixel 111 is formed in pixel chip 301, selectors 171 through 173 are formed in circuit chip 311, and pixel chip 301 and circuit chip 311 are bonded to each other by bonding portions.

As indicated in the table on the upper left in FIG. 17, input signal 171A or 171B is supplied as drive pulse signal SEL to the pixel circuit in accordance with the logic (L level/H level) of selection signal S171 input to selector 171. Likewise, input signal 172A or 172B is supplied as drive pulse signal RS to the pixel circuit in accordance with the logic (L level/H level) of selection signal S172 input to selector 172. Likewise, input signal 173A or 173B is supplied as drive pulse signal TG to the pixel circuit in accordance with the logic (L level/H level) of selection signal S173 input to selector 173.

FIG. 18A is a timing chart illustrating a first readout operation (the operation as a first pixel) performed by third pixel 131 illustrated in FIG. 17. The first readout operation illustrated in FIG. 18A is a mode in which third pixel 131 operates as a first pixel for obtaining a captured image.

As illustrated in FIG. 18A, two input signals 171A and 171B for drive pulse signal SEL to be input to selector 171 are respectively a signal having a long pulse width (the same as the pulse width of drive pulse signal SEL in FIG. 4B) and a signal having a short pulse width (the signal rises to H level at the same time as drive pulse signal SEL in FIG. 4B and falls to L level before drive pulse signal TG in FIG. 4B rises to H level). Two input signals 172A and 172B for drive pulse signal RS to be input to selector 172 are a pulse that rises from L level and a signal that is fixed at H level, respectively. Two input signals 173A and 173B for drive pulse signal TG to be input to selector 173 are a pulse that rises from middle-level and a signal that is fixed at middle-level, respectively.

In this mode, since each of the logics of selection signals S171 through S173 to be input to selectors 171 through 173 is L level, input signal 171A is output as drive pulse signal SEL from selector 171, input signal 172A is output as drive pulse signal RS from selector 172, and input signal 173A is output as drive pulse signal TG from selector 173.

As a result, the voltage waveform at FD portion 406 and the waveform of the output signal that appears in pixel signal line 420 are the same as in FIG. 4B, as illustrated in the waveforms denoted by "FD" and "pixel signal line" in FIG. 18A. In other words, it can be seen from FIG. 18A that third pixel 131 is operating as a first pixel for obtaining a captured image.

FIG. 18B is a timing chart illustrating a second readout operation (the operation of pixel identification with zero amplitude) performed by third pixel 131 illustrated in FIG. 17. The second readout operation illustrated in FIG. 18B is a mode in which third pixel 131 operates as a second pixel, according to one form, for individually identifying solid-state imaging device 10 (the signal output of the second pixel is zero).

As illustrated in FIG. 18B, two input signals to be input to each of selectors 171 through 173 are the same as in FIG. 18A In this mode, since the logics of selection signals S171 through S173 to be input to selectors 171 through 173 are respectively L level, H level, and H level, input signal 171A is output as drive pulse signal SEL from selector 171, input signal 172B is output as drive pulse signal RS from selector 172, and input signal 173B is output as drive pulse signal TG from selector 173.

As a result, the voltage waveform at FD portion 406 and the waveform of the output signal that appears in pixel signal line 420 are the same as in FIG. 8B, as illustrated in the waveforms denoted by "FD" and "pixel signal line" in FIG. 18B. In other words, it can be seen from FIG. 18B that the signal output is fixed to zero and third pixel 131 is operating as a second pixel for individually identifying solid-state imaging device 10.

FIG. 18C is a timing chart illustrating a third readout operation (the operation of pixel identification with amplitude) performed by third pixel 131 illustrated in FIG. 17. The third readout operation illustrated in FIG. 18C is a mode in which third pixel 131 operates as a second pixel, according to another form, for individually identifying solid-state imaging device 10 (the signal output of the second pixel is at maximum).

As illustrated in FIG. 18C, two input signals to be input to each of selectors 171 through 173 are the same as in FIG. 18A.

In this mode, since the logics of selection signals S171 through S173 to be input to selectors 171 through 173 are respectively H level, H level, and H level, input signal 171B is output as drive pulse signal SEL from selector 171, input signal 172B is output as drive pulse signal RS from selector 172, and input signal 173B is output as drive pulse signal TG from selector 173.

As a result, the voltage waveform of FD portion 406 and the waveform of the output signal that appears in pixel signal line 420 are the same as in FIG. 7B, as illustrated in the waveforms denoted by "FD" and "pixel signal line" in FIG. 18C. In other words, it can be seen from FIG. 18C that the signal output is fixed to the state indicating its maximum and third pixel 131 operates as a second pixel for individually identifying solid-state imaging device 10.

Figure 19:
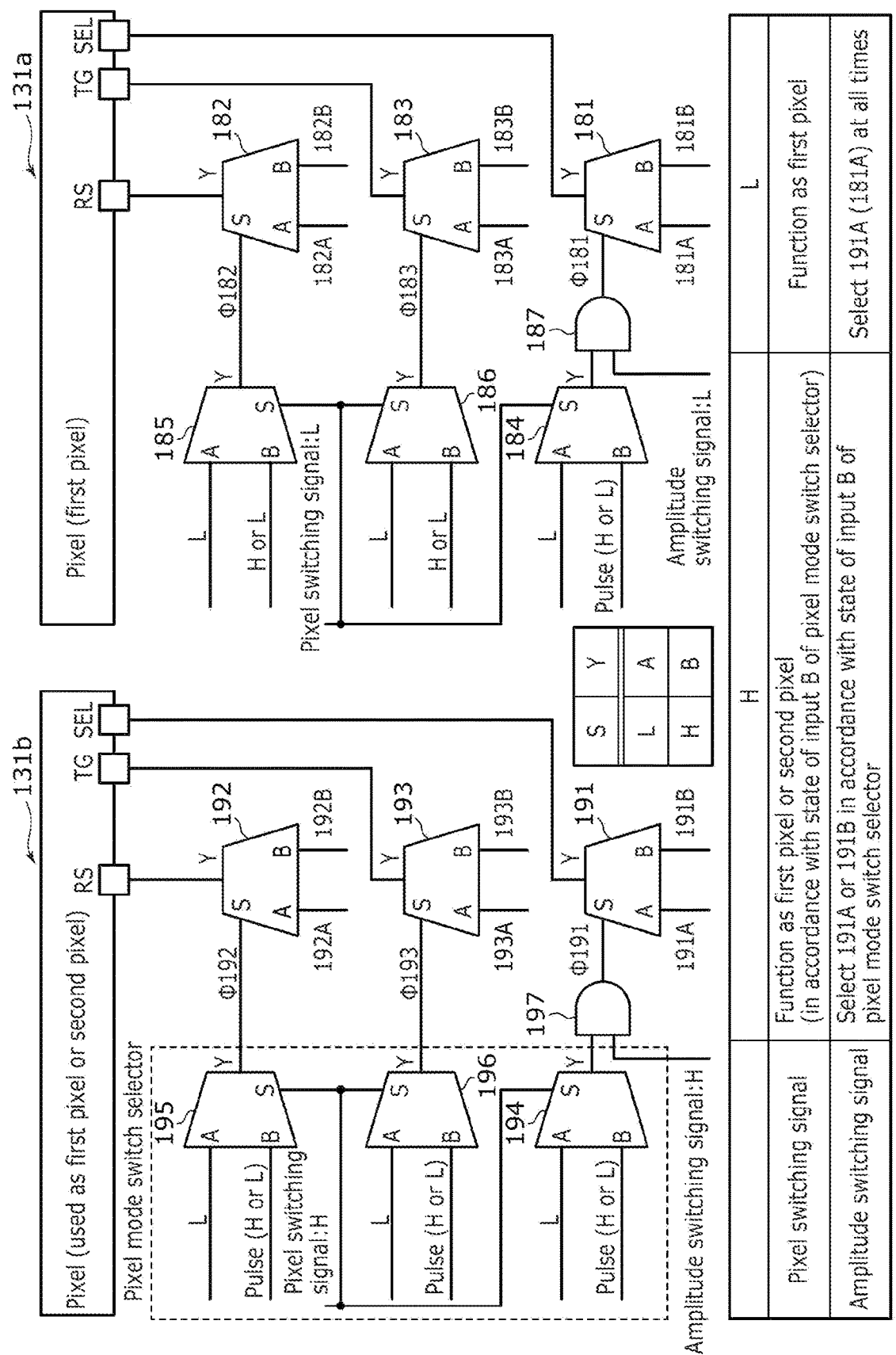
FIG. 19 is a circuit diagram illustrating an application example of the third pixel illustrated in FIG. 17.

FIG. 19 is a circuit diagram illustrating an application example of third pixel 131 illustrated in FIG. 17. The right half of FIG. 19 illustrates a circuit example of third pixel 131a that operates as a first pixel, and the left half of FIG. 19 illustrates a circuit example of third pixel 131b that selectively operates as a first pixel or a second pixel. A pixel circuit in a rectangular area indicated by "pixel (first pixel)" in third pixel 131a and a pixel circuit in a rectangular area indicated by "pixel (used as a first pixel or a second pixel)" in third pixel 131b are each the same as the pixel circuit formed in pixel chip 301 in FIG. 17.

As illustrated in FIG. 19, third pixel 131a includes: selectors 181 through 183 that respectively output three types of drive pulse signals, i.e., drive pulse signal SEL, drive pulse signal RS, and drive pulse signal TG; and selector 184 and AND gate 187, selector 185, and selector 186 that are for outputting selection signals S to selectors 181 through 183.

As illustrated in FIG. 19, third pixel 131b includes the same circuit configuration as third pixel 131a, that is, selectors 191 through 193 that respectively output three types of drive pulse signals, i.e., drive pulse signal SEL, drive pulse signal RS, and drive pulse signal TG, as well as selector 194 and AND gate 197, selector 195, and selector 196 that are for outputting selection signals S to selectors 191 through 193.

Input signal A of selectors 181 through 183 and selectors 191 through 193 is a drive pulse signal for operating the corresponding third pixel as a first pixel, and input signal B is a drive pulse signal for operating the corresponding third pixel as a second pixel.

A pixel switching signal is input as selection signal S to selectors 184 through 186 and selectors 194 through 196. As illustrated in the table at the lower part in FIG. 19, the pixel switching signal is a control signal for causing, at H level, the corresponding third pixel to selectively operate as a first pixel or a second pixel (i.e., to operate in accordance with the state of input signal B of pixel mode switch selectors (selectors 194 through 196), and causing, at L level, the corresponding third pixel to operate as a first pixel.

An amplitude switching signal is input to AND gates 187 and 197 as a single input signal. As illustrated in the table at the lower part in FIG. 19, the amplitude switching signal is a control signal for causing, at H level, selectors 181 and 191 to select and output input signal A or B in accordance with the state of input signal B of the pixel mode switch selectors (selectors 194 through 196), and causing, at L level, selectors 181 and 191 to select and output input signal A at all times.

Focusing on third pixel 131a, since the pixel switching signal is at L level at all times, input signal A that is fixedly at L level is output from selectors 184 through 186 and are respectively input as selection signals S of selectors 181, 182, and 183 via AND gate 197. Input signals A (input signals 181A, 182A, and 183A) are therefore respectively output from selectors 181 through 183 at all times, and this allows third pixel 131a to operate as a first pixel at the timing illustrated in FIG. 18A.

Focusing on third pixel 131b, since the pixel switching signal is at H level and the amplitude switching signal is at H level, at all times, input signal B that is a pulse (at H level or L level) is output from each of the pixel mode switch selectors (selectors 194 through 196) and is input as selection signal S of selector 191, selector 192, and selector 193 via AND gate 197. Selectors 191 through 193 each therefore select and output input signal A or B in accordance with the level of that selection signal S. Third pixel 131b thus operates as a first pixel or a second pixel in accordance with the level of input signal B of the pixel mode switch selectors (selectors 194 through 196).

According to the application example of third pixel 131 illustrated in FIG. 19, third pixel 131 can be either third pixel 131a that operates as a first pixel or third pixel 131b that operates as a first pixel or a second pixel in accordance with an input signal, depending on a pixel switching signal and an amplitude switching signal provided from outside.

A first pixel, according to the present disclosure, for obtaining a captured image therefore includes not only a pixel for fixedly obtaining a captured image, which is illustrated in FIG. 4A, but also a third pixel having functions of both a first pixel and a second pixel, as illustrated in FIG. 17 and FIG. 19, and operating as a first pixel.

Likewise, a second pixel, according to the present disclosure, for individually identifying a solid-state imaging device, which is illustrated in, for instance, FIG. 5A, includes not only a pixel that has a function of fixedly performing individual identification, but also a third pixel having functions of both a first pixel and a second pixel, as illustrated in FIG. 17 and FIG. 19, and operating as a second pixel. In other words, since a third pixel is a pixel whose wiring is different from the wiring of a first pixel or a pixel whose signal source (drive source) connected to the first pixel is different, it can be also said, in view of this point, that "a third pixel is a second pixel including circuit elements different from circuit elements in a first pixel".

Although the solid-state imaging device and the imaging apparatus according to the present disclosure have been described above based on embodiments and variations, the present disclosure is not limited to these embodiments and variations. Various modifications to the embodiments or variations which may be conceived by those skilled in the art, as well as other forms resulting from combinations of one or more elements from different embodiments are also included within the scope of the present disclosure so long as they do not depart from the essence of the present disclosure.

For example, second pixel 121 has, as a pixel circuit, any one of the pixel circuits illustrated in FIG. 5A, FIG. 6A, FIG. 7A, FIG. 8A, and FIG. 8C, and has, as a structure, any one of the structures illustrated in FIG. 9 and FIG. 10. Combinations of the pixel circuits and the structures can increase (multinarize) individual identification information to be output by a single second pixel.

Moreover, second pixels 121 disposed in second area 120 are not limited to one type, and may include at least two types of pixels selected from pixels each having, as a pixel circuit, any one of the pixel circuits illustrated in FIG. 5A, FIG. 6A, FIG. 7A, FIG. 8A, and FIG. 8C and having, as a structure, any one of the structures illustrated in FIG. 9 and FIG. 10. Increasing the type of second pixel 121 to be disposed in second area 120 can increase the type (further increase the uniqueness) of individual identification of solid-state imaging device 10.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure relates to solid-state imaging devices as well as imaging apparatuses or distance-measuring imaging apparatuses that use solid-state imaging devices as image capturing devices, and is applicable to, for example, medical endoscopes.

The invention claimed is:

1. A solid-state imaging device comprising:
a pixel array that is quadrilateral and includes pixels arranged in rows and columns, each of the pixels accumulating an electric charge resulting from photoelectric conversion, wherein:
the pixel array includes:
a first area including first pixels for obtaining a captured image; and
a second area including a second pixel for individually identifying the solid-state imaging device, the second area being provided in a vicinity of at least one corner among four corners of the pixel array, the vicinity being a range of a predetermined number of pixels away from the at least one corner, the second pixel including circuit elements different from circuit elements in each of the first pixels,
the first pixels and the second pixel each include a photodiode,
the second pixel includes one or more circuit elements that are same as the circuit elements in each of the first pixels, and
one or more of connections of the circuit elements in the second pixel are different from connections of the circuit elements in each of the first pixels.

2. The solid-state imaging device according to claim 1, wherein
the vicinity is inside the quadrilateral and is outside a circle that contacts at least one of two opposing sides of the quadrilateral or a circle that is inside the quadrilateral and contacts neither of the two opposing sides.

3. The solid-state imaging device according to claim 1, wherein
the circuit elements in each of the first pixel and the second pixel include an amplifier transistor, and
an output potential of the amplifier transistor in the second pixel is different from an output potential of the amplifier transistor in each of the first pixels when the second pixel and the first pixels are irradiated with a same amount of light.

4. The solid-state imaging device according to claim 3, wherein a gate of the amplifier transistor in the second pixel is connected to a second semiconductor substrate different from a first semiconductor substrate on which the pixel array is disposed.

5. The solid-state imaging device according to claim 3, wherein
a gate potential of the amplifier transistor in the second pixel is different from a gate potential of the amplifier transistor in each of the first pixels when the second pixel and the first pixels are irradiated with a same amount of light.

6. The solid-state imaging device according to claim 5, wherein
the gate potential of the amplifier transistor in the second pixel is switched to an electric potential selected from among at least two types of electric potentials including a first signal potential and a second signal potential.

7. The solid-state imaging device according to claim 6, wherein
the circuit elements in each of the first pixel and the second pixel include a reset transistor, and
the first signal potential is same as a drain potential of the reset transistor in the second pixel.

8. The solid-state imaging device according to claim 6, wherein
the second signal potential is same as a ground potential of the second pixel.

9. The solid-state imaging device according to claim 5, wherein
the circuit elements in each of the first pixel and the second pixel include a reset transistor, and
the gate potential of the amplifier transistor in the second pixel is same as a drain voltage of the reset transistor in the second pixel.

10. The solid-state imaging device according to claim 5, wherein
the gate potential of the amplifier transistor in the second pixel is same as a ground potential of the second pixel.

11. The solid-state imaging device according to claim 3, further comprising:
a control circuit that performs control of changing an output of the amplifier transistor in the second pixel, wherein
the pixel array is one of pixel chips that are two-dimensionally arranged on a first semiconductor substrate,
the control circuit is one of circuit chips that are two-dimensionally arranged on a second semiconductor substrate, and
arrays of rows and columns of the pixel chips on the first semiconductor substrate are different from arrays of rows and columns of the circuit chips on the second semiconductor substrate.

12. The solid-state imaging device according to claim 1, wherein
the circuit elements in each of the first pixel and the second pixel include a reset transistor, and
a signal line connected to a gate of the reset transistor in the second pixel is connected to a circuit of a type different from a type of a circuit to which a signal line connected to a gate of the reset transistor in each of the first pixels is connected.

13. The solid-state imaging device according to claim 1, wherein:
the circuit elements in each of the first pixel and the second pixel include a transfer transistor, and
a signal line connected to a gate of the transfer transistor in the second pixel is connected to a circuit of a type different from a type of a circuit to which a signal line connected to a gate of the transfer transistor in each of the first pixels is connected.

14. The solid-state imaging device according to claim 1, wherein
an element having a light transmission property is disposed above the photodiode in the second pixel, the light transmission property being different from a light transmission property above the photodiode in the first pixel.

15. The solid-state imaging device according to claim 14, wherein
light is entirely or partly blocked above the photodiode in the second pixel.

16. The solid-state imaging device according to claim 14, wherein
the photodiodes include a photodiode above which an on-chip color filter is disposed, and
a thickness of at least one of the on-chip color filters disposed above the photodiodes in the second area is different from a thickness of each of the on-chip color filters disposed above the photodiodes in the first area.

17. The solid-state imaging device according to claim 16, wherein
the thickness of the at least one of the on-chip color filters disposed above the photodiodes in the second area is less than the thickness of each of the on-chip color filters disposed above the photodiodes in the first area.

18. The solid-state imaging device according to claim 14, wherein
an on-chip color filter is disposed above the photodiode in each of the first pixels, and
an on-chip color filter is not disposed above the photodiode in the second pixel.

19. An imaging apparatus comprising:
the solid-state imaging device according to claim 1 that captures an image of a subject;
an imaging optical system that guides incident light from the subject to the solid-state imaging device; and
a signal processing circuit that processes an output signal from the solid-state imaging device.

\* \* \* \* \*